US012659824B2

(12) United States Patent
Chapman et al.

(10) Patent No.: US 12,659,824 B2
(45) Date of Patent: Jun. 16, 2026

(54) WIRELESS COMMUNICATIONS IN HIGH SPEED TRAIN OPERATION

(71) Applicant: Telefonaktiebolaget LM Ericsson (publ), Stockholm (SE)

(72) Inventors: Thomas Chapman, Solna (SE); Farshid Ghasemzadeh, Sollentuna (SE); Fredrik Sundström, Sundbyberg (SE); Yi-Ju Chen, Solna (SE); Joakim Axmon, Limhamn (SE); Ming Li, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 18/272,782

(22) PCT Filed: Jan. 15, 2022

(86) PCT No.: PCT/IB2022/050363
§ 371 (c)(1),
(2) Date: Jul. 17, 2023

(87) PCT Pub. No.: WO2022/153274
PCT Pub. Date: Jul. 21, 2022

(65) Prior Publication Data
US 2024/0323781 A1    Sep. 26, 2024

Related U.S. Application Data

(60) Provisional application No. 63/138,141, filed on Jan. 15, 2021.

(51) Int. Cl.
*H04W 36/08* (2009.01)
*H04W 36/00* (2009.01)
*H04W 36/30* (2009.01)

(52) U.S. Cl.
CPC ....... *H04W 36/08* (2013.01); *H04W 36/0072* (2013.01); *H04W 36/30* (2013.01)

(58) Field of Classification Search
CPC . H04W 36/08; H04W 36/0072; H04W 36/30; H04W 56/0045
See application file for complete search history.

(56) References Cited

U.S. PATENT DOCUMENTS

2021/0235342 A1*  7/2021  Zhu .................. H04W 36/0058
2022/0217669 A1*  7/2022  Bai ......................... H04W 8/24

* cited by examiner

*Primary Examiner* — Shawn D Miller
(74) *Attorney, Agent, or Firm* — Sonoda & Kobayashi Intellectual Property Law; Sarvajit S. Patil

(57) ABSTRACT

A method performed by a user equipment, UE, includes obtaining a maximum timing advance (TA) for wireless communications to apply for a serving base station, BS, switching in a high speed train (HST) network. The method includes updating the TA for wireless communications according to TA commands as the UE proceeds along a track in the HST network. The method includes determining that the BS panel serving the UE has switched to a new BS panel along the track. The method includes responsive to determining that the BS panel serving the UE has switched to the new BS panel, setting the TA to a minimum TA for wireless communication or to the maximum TA for wireless communications based on a direction of travel of the HST with respect to the new BS panel.

22 Claims, 24 Drawing Sheets

BS ANTENNA PANEL

TRAIN MOUNTED UE WITH ONE PANEL

BS PLACED ALONG TRACK

TRACK

TRAIN

BS ANTENNA PANELS

TRAIN MOUNTED UE WITH TWO PANELS

BS PLACED ALONG TRACK

TRACK

TRAIN

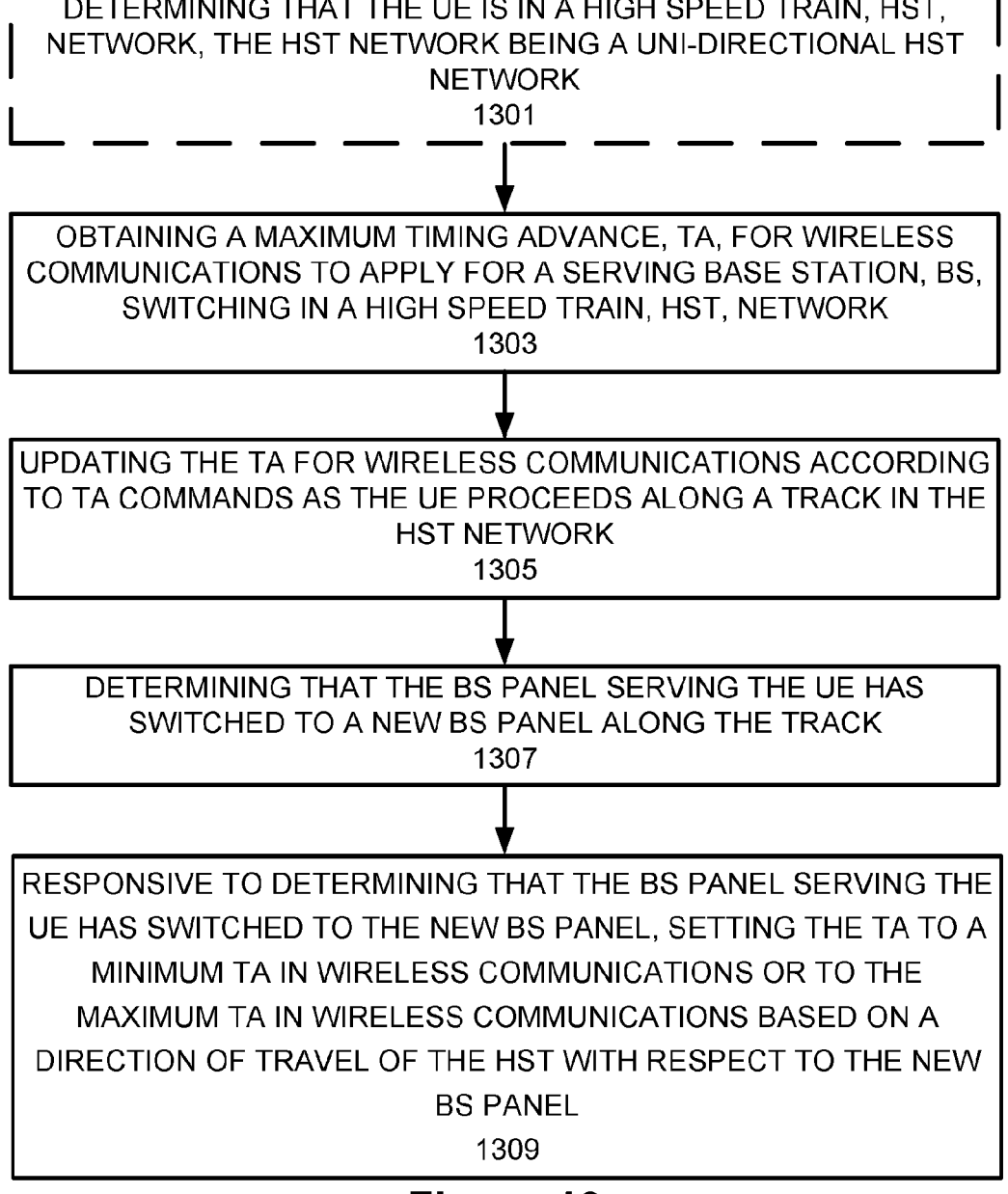

DETERMINING THAT THE UE IS IN A HIGH SPEED TRAIN, HST, NETWORK, THE HST NETWORK BEING A UNI-DIRECTIONAL HST NETWORK
1301

OBTAINING A MAXIMUM TIMING ADVANCE, TA, FOR WIRELESS COMMUNICATIONS TO APPLY FOR A SERVING BASE STATION, BS, SWITCHING IN A HIGH SPEED TRAIN, HST, NETWORK
1303

UPDATING THE TA FOR WIRELESS COMMUNICATIONS ACCORDING TO TA COMMANDS AS THE UE PROCEEDS ALONG A TRACK IN THE HST NETWORK
1305

DETERMINING THAT THE BS PANEL SERVING THE UE HAS SWITCHED TO A NEW BS PANEL ALONG THE TRACK
1307

RESPONSIVE TO DETERMINING THAT THE BS PANEL SERVING THE UE HAS SWITCHED TO THE NEW BS PANEL, SETTING THE TA TO A MINIMUM TA IN WIRELESS COMMUNICATIONS OR TO THE MAXIMUM TA IN WIRELESS COMMUNICATIONS BASED ON A DIRECTION OF TRAVEL OF THE HST WITH RESPECT TO THE NEW BS PANEL
1309

Figure 13

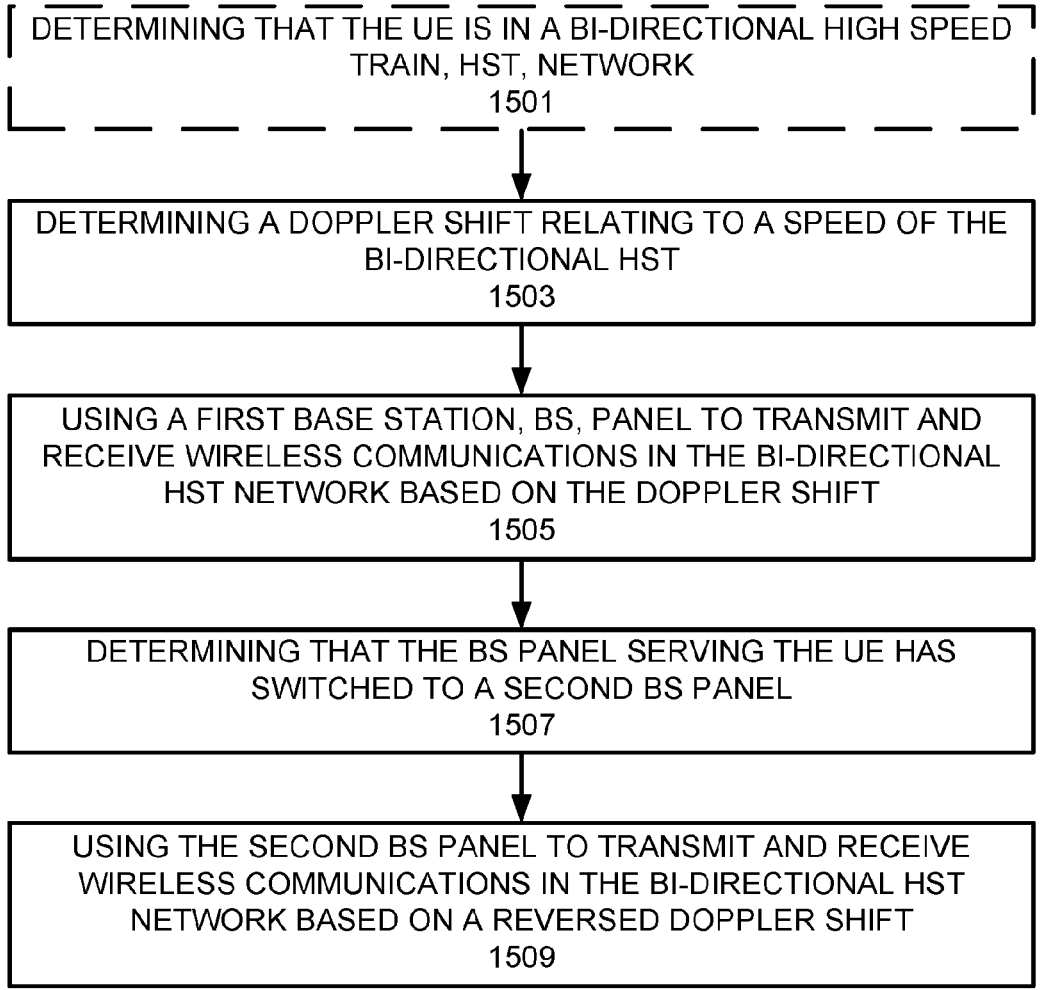

DETERMINING THAT THE UE IS IN A BI-DIRECTIONAL HIGH SPEED TRAIN, HST, NETWORK
1501

DETERMINING A DOPPLER SHIFT RELATING TO A SPEED OF THE BI-DIRECTIONAL HST
1503

USING A FIRST BASE STATION, BS, PANEL TO TRANSMIT AND RECEIVE WIRELESS COMMUNICATIONS IN THE BI-DIRECTIONAL HST NETWORK BASED ON THE DOPPLER SHIFT
1505

DETERMINING THAT THE BS PANEL SERVING THE UE HAS SWITCHED TO A SECOND BS PANEL
1507

USING THE SECOND BS PANEL TO TRANSMIT AND RECEIVE WIRELESS COMMUNICATIONS IN THE BI-DIRECTIONAL HST NETWORK BASED ON A REVERSED DOPPLER SHIFT
1509

Figure 15

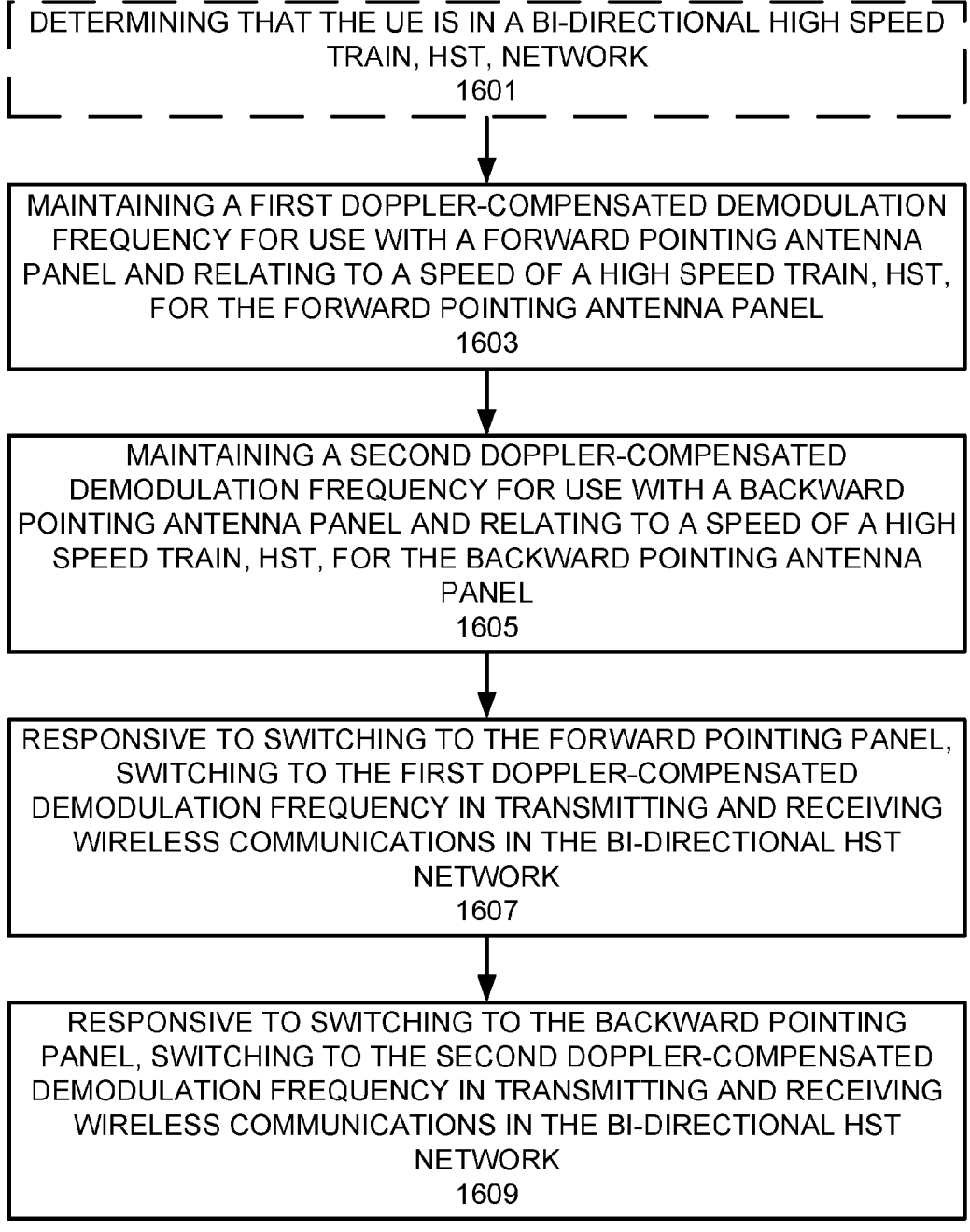

DETERMINING THAT THE UE IS IN A BI-DIRECTIONAL HIGH SPEED TRAIN, HST, NETWORK
1601

MAINTAINING A FIRST DOPPLER-COMPENSATED DEMODULATION FREQUENCY FOR USE WITH A FORWARD POINTING ANTENNA PANEL AND RELATING TO A SPEED OF A HIGH SPEED TRAIN, HST, FOR THE FORWARD POINTING ANTENNA PANEL
1603

MAINTAINING A SECOND DOPPLER-COMPENSATED DEMODULATION FREQUENCY FOR USE WITH A BACKWARD POINTING ANTENNA PANEL AND RELATING TO A SPEED OF A HIGH SPEED TRAIN, HST, FOR THE BACKWARD POINTING ANTENNA PANEL
1605

RESPONSIVE TO SWITCHING TO THE FORWARD POINTING PANEL, SWITCHING TO THE FIRST DOPPLER-COMPENSATED DEMODULATION FREQUENCY IN TRANSMITTING AND RECEIVING WIRELESS COMMUNICATIONS IN THE BI-DIRECTIONAL HST NETWORK
1607

RESPONSIVE TO SWITCHING TO THE BACKWARD POINTING PANEL, SWITCHING TO THE SECOND DOPPLER-COMPENSATED DEMODULATION FREQUENCY IN TRANSMITTING AND RECEIVING WIRELESS COMMUNICATIONS IN THE BI-DIRECTIONAL HST NETWORK
1609

Figure 16

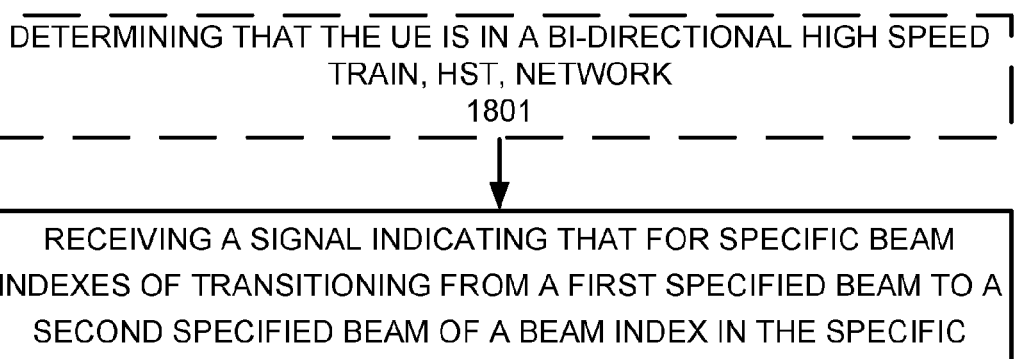

DETERMINING THAT THE UE IS IN A BI-DIRECTIONAL HIGH SPEED TRAIN, HST, NETWORK
1801

RECEIVING A SIGNAL INDICATING THAT FOR SPECIFIC BEAM INDEXES OF TRANSITIONING FROM A FIRST SPECIFIED BEAM TO A SECOND SPECIFIED BEAM OF A BEAM INDEX IN THE SPECIFIC BEAM INDEXES IN THE BEAM INDEXES OF THE PLURALITY OF BEAMS, A RECEIVER PANEL AND DOPPLER COMPENSATION IS NOT TO BE CHANGED WHEREAS THAT FOR OTHER SPECIFIC BEAM INDEXES OF TRANSITIONING FROM THIRD SPECIFIED BAM TO A FOURTH SPECIFIED BEAM IN THE OTHER SPECIFIC BEAM INDEXES, THE RECEIVER PANEL AND THE DOPPLER COMPENSATION IS NEEDED
1803

RESPONSIVE TO TRANSITIONING FROM THE FIRST SPECIFIED BEAM TO THE SECOND SPECIFIED BEAM, TRANSITIONING WITHOUT CHANGING THE RECEIVER PANEL AND THE DOPPLER COMPENSATION
1805

RESPONSIVE TO TRANSITIONING FROM THE FIRST SPECIFIED BEAM TO THE SECOND SPECIFIED BEAM, TRANSITIONING AND CHANGING THE RECEIVER PANEL AND THE DOPPLER COMPENSATION
1807

Figure 18

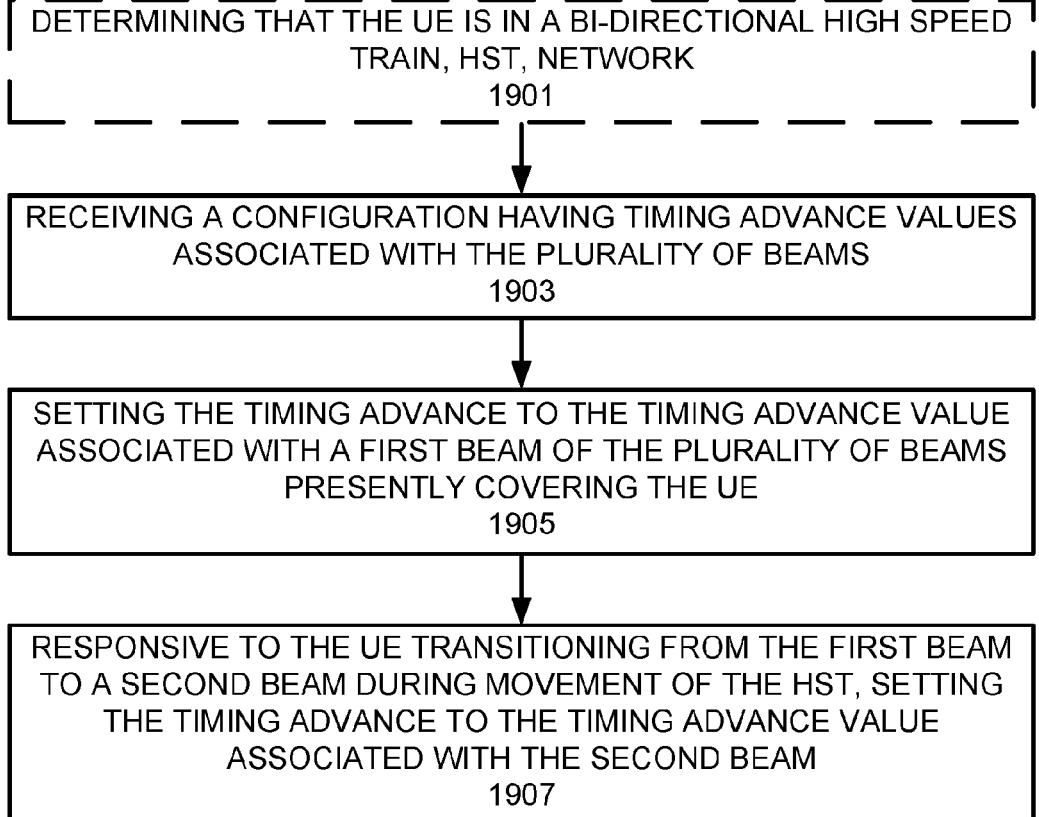

DETERMINING THAT THE UE IS IN A BI-DIRECTIONAL HIGH SPEED TRAIN, HST, NETWORK
1901

RECEIVING A CONFIGURATION HAVING TIMING ADVANCE VALUES ASSOCIATED WITH THE PLURALITY OF BEAMS
1903

SETTING THE TIMING ADVANCE TO THE TIMING ADVANCE VALUE ASSOCIATED WITH A FIRST BEAM OF THE PLURALITY OF BEAMS PRESENTLY COVERING THE UE
1905

RESPONSIVE TO THE UE TRANSITIONING FROM THE FIRST BEAM TO A SECOND BEAM DURING MOVEMENT OF THE HST, SETTING THE TIMING ADVANCE TO THE TIMING ADVANCE VALUE ASSOCIATED WITH THE SECOND BEAM
1907

Figure 19

WIRELESS COMMUNICATIONS IN HIGH SPEED TRAIN OPERATION

RELATED APPLICATIONS

This application is a national phase application of International Patent Application No. PCT/IB2022/050363, filed Jan. 17, 2022, which claims the benefit of U.S. Provisional Patent Application No. 63/138,141, filed Jan. 15, 2021, the disclosure of which are hereby incorporated herein by reference in their entirety.

TECHNICAL FIELD

The present disclosure relates generally to communications, and more particularly to communication methods and related devices and nodes supporting wireless communications.

INTRODUCTION

3GPP RAN4 created radio frequency (RF) and radio resource management (RRM) requirements for operation of new radio (NR) for high speed trains (HST) in Frequency Range 1 (FR1). The specification of FR1 HST followed specification of Enhanced Universal Terrestrial Radio Access (E-UTRA) High Speed Train (HST). 3GPP have approved a RAN4 Work Item for the development of specifications for RF, RRM and demodulation enabling serving High Speed Trains using Frequency Range 2 (FR2), and in particular the bands around 28 GHz.

A key aspect of serving High Speed Train user equipments (UEs) is that a significant Doppler shift is experienced at both network and UE receivers. Doppler shift refers to a frequency shift of the received signal compared to the transmitted signal due to the motion of the train. The frequency shift is dependent on the speed and direction of the UE in the train. Of particular interest is that if the UE and train are moving directly towards an object with a certain speed, the Doppler shift will be negative compared to the UE moving directly away from the object with the same speed. The object could be another train, a base station, another UE, a network receiver, etc.

The UE may be a mobile terminal inside the train or a deliberately designed receiver attached to the outside of the train. Typically, for FR1 UEs inside the train are served, whereas for FR2 the UE is mounted outside of the train, and the data is distributed from the UE inside the train by proprietary means.

For a high-speed train operation, base stations (BSs) are typically placed along the track with a certain interval in between. RRM algorithms are specified such that the network is aware of the BS(s) which are best placed to serve the UE and operates TCI (transmission configuration indicator) state change or handover between the BSs as the train moves along the track. For FR1, two types of deployments have been considered; so-called "uni-directional" and so-called "bi-directional."

In a uni-directional deployment (illustrated in FIG. 1), the antennae from all BSs point in the same direction along the track. For FR1 deployments, depending on the spacing between the BSs the UE may be able to transmit and receive signals to/from more than one of the BSs. For the downlink, if several BSs transmit to the UE then the transmitted signals will combine over the air and appear at the UE receiver with different delays, depending on the distances of the BSs from the UEs. Since the direction of all BSs with respect to the UE is the same in a uni-directional deployment, the Doppler shift experienced at the UE will be constant.

In a bi-directional deployment (illustrated in FIG. 2), BSs are located along the track with antennas pointing in both directions. In FR1, BSs may transmit towards UEs from both directions and the signals will combine over the air. Since the UE is travelling towards one BS and away from the other, then in between the two BSs, the UE in this case receives a signal comprising at least two components with opposite Doppler shift. When the UE passes a BS, it will experience a strong signal from the BS it is passing. At the moment the UE passes the BS, it will change from moving towards the BS to moving away from the BS. This direction change will cause a reversal of the Doppler shift experience in the UE (and BS) receiver.

For FR2, there are some important differences to FR1. Due to the mm wave frequencies and pathloss, it is necessary to perform beamforming at both the transmitter and receiver. The BS needs to point a beam towards the UE and the UE needs to point a beam towards the BS. Furthermore, both UE and BS comprise so-called antenna panels, which are arrays of antenna elements. A large antenna array can also be divided into different independent panels where each panel uses certain part of the antenna array. An antenna panel can transmit or receive beams in one 2D plane and thus to provide 3D coverage, several panels are required pointing in opposite directions. In general, so-called analogue beamforming is implemented. Analogue beamforming refers to a technique in which the phase shifts that effect the beamforming pattern are implemented within the analogue parts of the radio. One of the consequences of analogue beamforming is that each panel is able to form only one beam at a time across the whole of its bandwidth.

Digital beamforming solutions based on e.g. applying precoding weights are not precluded.

For a uni-directional deployment, it may be envisaged that each BS along the track will have at least one panel pointing towards the UE and each UE will have one panel pointing towards the BS (the UE panel is likely to be mounted externally to the train). For some deployments, it may be that the beam at the UE may be that more than one BS along the track falls within the same UE beam, and thus uni-directional deployments may be able to transmit/receive to/from the UE from more than one BS, similar to FR1. On the other hand, there may be deployments for which only one BS at a time can be covered within the UE beam and the UE points its beam towards the nearest BS.

For a bi-directional deployment, each BS and each UE needs to be equipped with at least two panels pointing in opposite directions (again the UE is most likely a device mounted externally on the train). As the UE travels along the track, when it reaches the point in-between two BSs, then the network may need to switch the BS that serves the UE and the UE will need to switch the panel and beam that is used to communicate with the network as illustrated in FIG. 3. Alternatively, the network may transmit/receive from BS in both directions and the UE may transmit/receive from both panels.

When the UE passes a bi-directional node, the network needs to switch the panel and beam that are used to serve the UE, and the UE also needs to switch panel and beam. This is illustrated in FIG. 4.

Unlike FR1, for FR2 even if the network transmits to the UE from both directions, there is no over the air SFN (single frequency network) combining because the UE must use different panels and point different beams to the different BSs. Each UE panel will only receive from the BS that it points towards, and so it is not possible to receive a combined signal from both BSs. What is possible is to combine the received signal from the panels of each direction inside the BS by post-processing.

For FR2, all frequency bands operate TDD. Due to the propagation delay between the BS and UE, it is necessary for the UE to adjust the timing of its transmission in uplink timeslots such that at the BS, after the propagation delay, the UL signal is received at the correct time. The timing adjustment that is needed depends on the distance between the UE and the BS. The timing advance is set and adjusted by network signaling to the UE. Since for an HST setup the UE is continuously moving with respect to the BS, the timing advance of the uplink is continuously updated. The updates occur by means of the network assessing the receive timing from the UE and sending Timing Advance commands, which cause the UE to adjust its timing.

For uni-directional deployments, the existing solution is to make RRM measurements on the signal strength from the different BS. As a UE approaches and passes a BS, the network needs to switch the BS that serves the UE. When the UE switches the BS, its timing will initially be incorrect. If the UE is travelling towards BSs, then just before it passes one BS it will be close and the propagation delay & timing adjustment almost zero. Immediately after the UE starts transmitting to the next BS, the propagation delay will jump and the currently set UL timing will be incorrect. The delay is illustrated in FIG. 5. If the UE is travelling away from BS then the opposite will occur; just before the UE passes a BS it will be at its maximum distance (and hence maximum propagation delay and timing advance) from the previous BS. When the UE first begins transmitting to the new BS, it will be close and the propagation delay will be near zero, but the timing advance will still be a large value. FIG. 6 illustrates an example of timing jumps that can occur.

A further problem is that the UE timing needs to be continuously updated as the train moves along the track. The update is based upon the UE making transmissions and the network making measurements of the received timing and instructing the UE to change the timing using small timing adjustments. In some cases, however the UE may not have data to transmit and the network cannot assess the timing. During the time of no data transmission, the UE may have moved along the track towards or away from the BS and the timing may have changed. Either timing errors will occur, or the UE will need to send unnecessary transmissions for the purpose of measuring timing.

For bi-directional deployments, a switch of BS and panel occurs in two places. When the UE is between two BS, the network may need to switch BS and at the same time the UE may need to switch panel. When this switch is made, the direction of the UE panel with respect to the BS panel reverses and thus the Doppler shift experienced in the received signal at both UE and BS will suddenly reverse. This is illustrated in FIG. 7.

The same effect will occur as the UE passes a BS as illustrated in FIG. 8. In this case, the network needs to change the panel that is used to serve the UE and the UE needs to change the panel pointing towards the network. The Doppler experienced in both the UE and the network will reverse. The Doppler reversal is illustrated in FIG. 9.

SUMMARY

Various embodiments of inventive concepts use knowledge of the fact that the deployment is an HST deployment in order to improve performance by means of updating timing advance or knowledge of Doppler shift when a panel or beam is changed. Both the UE and the network are aware when the serving BS and/or UE panel are changed. For a uni-directional deployment, according to various embodiments of inventive concepts, the UE can use the knowledge that the serving BS has changed to update its UL timing advance value such that timing advance is immediately correct for transmitting to the new BS. The required shift of timing advance could be signaled to the UE in advance, possibly as part of the call setup and may be beam specific. The UE could autonomously change the timing advance when the serving BS is changed or could change it based on a special command.

For various embodiments of inventive concepts for a bi-directional deployment, the UE and network can both assume that when a panel and/or BS is switched, then the Doppler reverses. This would avoid the need to detect a Doppler reversal. The UE may receive an indication using signaling that it is in an HST deployment and can assume that Doppler reversal takes place when the panel is switched.

According to some embodiments of inventive concepts, A method performed by a user equipment, UE, includes obtaining a maximum timing advance, TA, for wireless communications to apply for a serving base station, BS, switching in a high speed train, HST, network. The method includes updating the TA for wireless communications according to TA commands as the UE proceeds along a track in the HST network. The method includes determining that the BS panel serving the UE has switched to a new BS panel along the track. The method includes responsive to determining that the BS panel serving the UE has switched to the new BS panel, setting the TA to a minimum TA for wireless communication or to the maximum TA for wireless communications based on a direction of travel of the HST with respect to the new BS panel.

For uni-directional deployments, advantages that may be achieved include the immediate update of timing advance would mitigate data loss or distortion due to incorrect transmit timing at the UE and potentially the need for unnecessary transmissions that are only for the purpose of timing measurement.

For bi-directional deployments, advantages that may be achieved include when assuming a switch in Doppler when a panel is changed is reduction in the amount of reference symbol overhead needed for Doppler detection and may also reduce receiver performance reduction immediately after the panel is switched.

According to other embodiments, a method performed by a user equipment, UE, includes determining a Doppler shift relating to a speed of the HST. The method includes using a first base station, BS, panel to transmit and receive wireless communications in the bi-directional HST network based on the Doppler shift. The method includes determining that the BS panel serving the UE has switched to a second BS panel. The method includes using the second panel to transmit and receive wireless communications in the bi-directional HST network based on a reversed Doppler shift.

According to some other embodiments, a method performed by a user equipment, UE, in a bi-directional high speed train, HST, deployment includes maintaining a first Doppler-compensated demodulation frequency for use with a forward pointing antenna panel and relating to a speed of a high speed train, HST, for the forward pointing antenna panel. The method includes determining a second Doppler-compensated demodulation frequency for use with a backwards pointing antenna panel and relating to a speed of a high speed train, HST, for a backwards pointing antenna panel. The method includes responsive to switching to the forward pointing panel, switching to the first Doppler-compensated demodulation frequency in transmitting and receiving wireless communications in the bi-directional HST network. The method includes responsive to switching to the backward pointing panel, switching to the second Doppler-compensated demodulation frequency in transmitting and receiving wireless communications in the bi-directional HST network.

According to some other embodiments, a method performed by a user equipment, UE, in a bi-directional high speed train, HST, network having a track covered by a plurality of beams for wireless communications, includes receiving a signal indicating that for specific beam indexes of transitioning from a first specified beam to a second specified beam of a beam index in the specific beam indexes in the beam indexes of the plurality of beams, a receiver panel and Doppler compensation is not to be changed whereas that for other specific beam indexes of transitioning from third specified bam to a fourth specified beam in the other specific beam indexes, the receiver panel and the Doppler compensation is needed. The method includes responsive to transitioning from the first specified beam to the second specified beam, transitioning without changing the receiver panel and the Doppler compensation. The method includes responsive to transitioning from the third specified beam to the fourth specified beam, transitioning and changing the receiver panel and the Doppler compensation with the transitioning.

According to some other embodiments, a method performed by a user equipment, UE, in a bi-directional high speed train, HST, network having a track covered by a plurality of beams for wireless communications includes receiving a configuration having timing advance values associated with the plurality of beams. The method includes setting the timing advance to the timing advance value associated with a first beam of the plurality of beams presently covering the UE. The method includes responsive to the UE transitioning from the first beam to a second beam during movement of the HST, setting the timing advance to the timing advance value associated with the second beam.

Analogous user equipment, computer program, and computer programs are provided in other embodiments.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 13 is a flow chart illustrating operations of a user equipment in the HST deployment of FIG. 12 according to some embodiments of inventive concepts;

FIG. 15 is a flow chart illustrating operations of a user equipment in the HST deployment of FIG. 14 according to some embodiments of inventive concepts;

FIG. 16 is a flow chart illustrating operations of a user equipment in the HST deployment of FIG. 14 according to some embodiments of inventive concepts;

FIG. 18 is a flow chart illustrating operations of a user equipment in the HST deployment of FIG. 17 according to some embodiments of inventive concepts;

FIG. 19 is a flow chart illustrating operations of a user equipment in the HST deployment of FIG. 17 according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figures 1, 2:
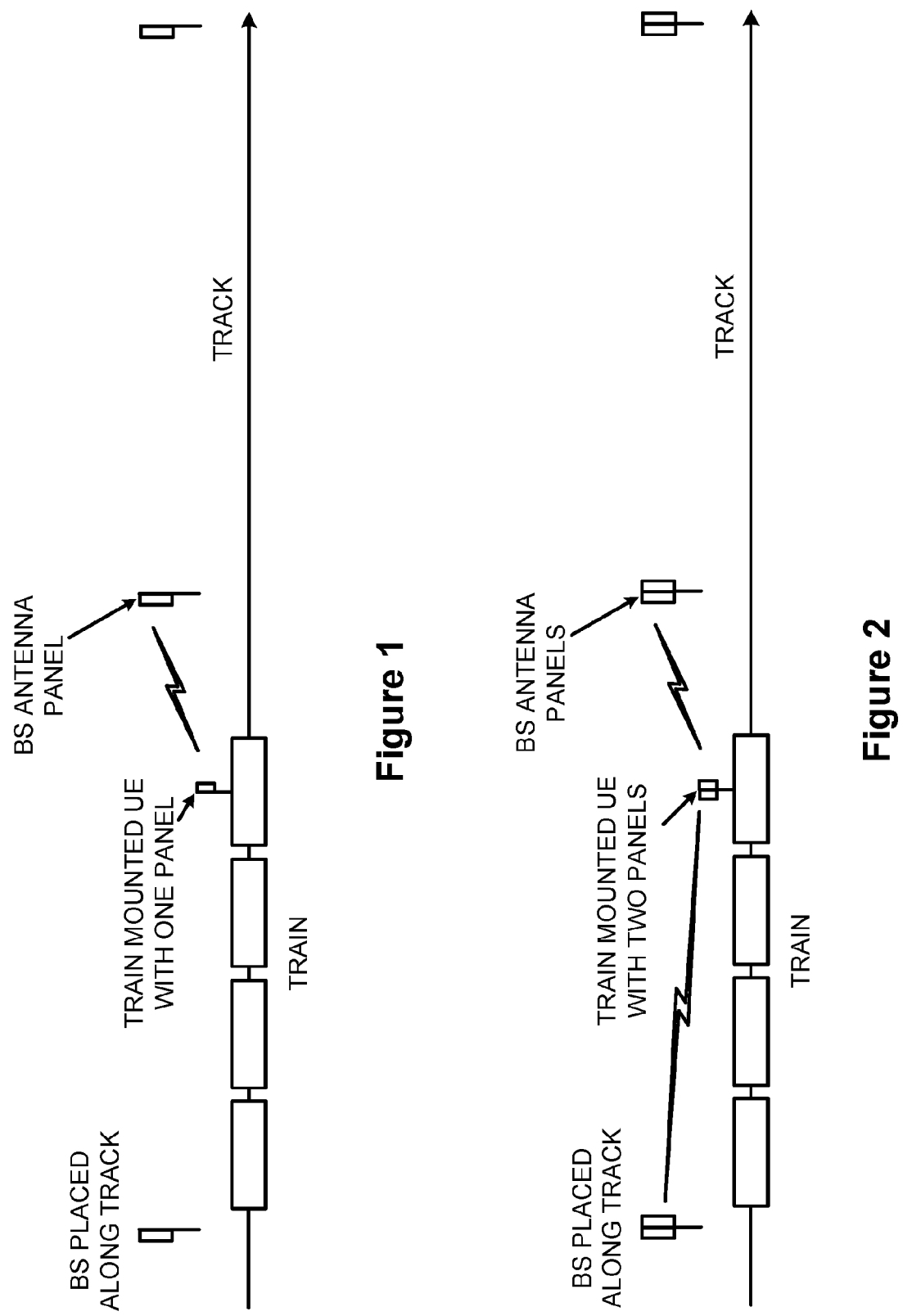
FIG. 1 is an illustration of uni-directional HST operation in FR2.
FIG. 2 is an illustration of bi-directional HST operation in FR2.
Figure 3:
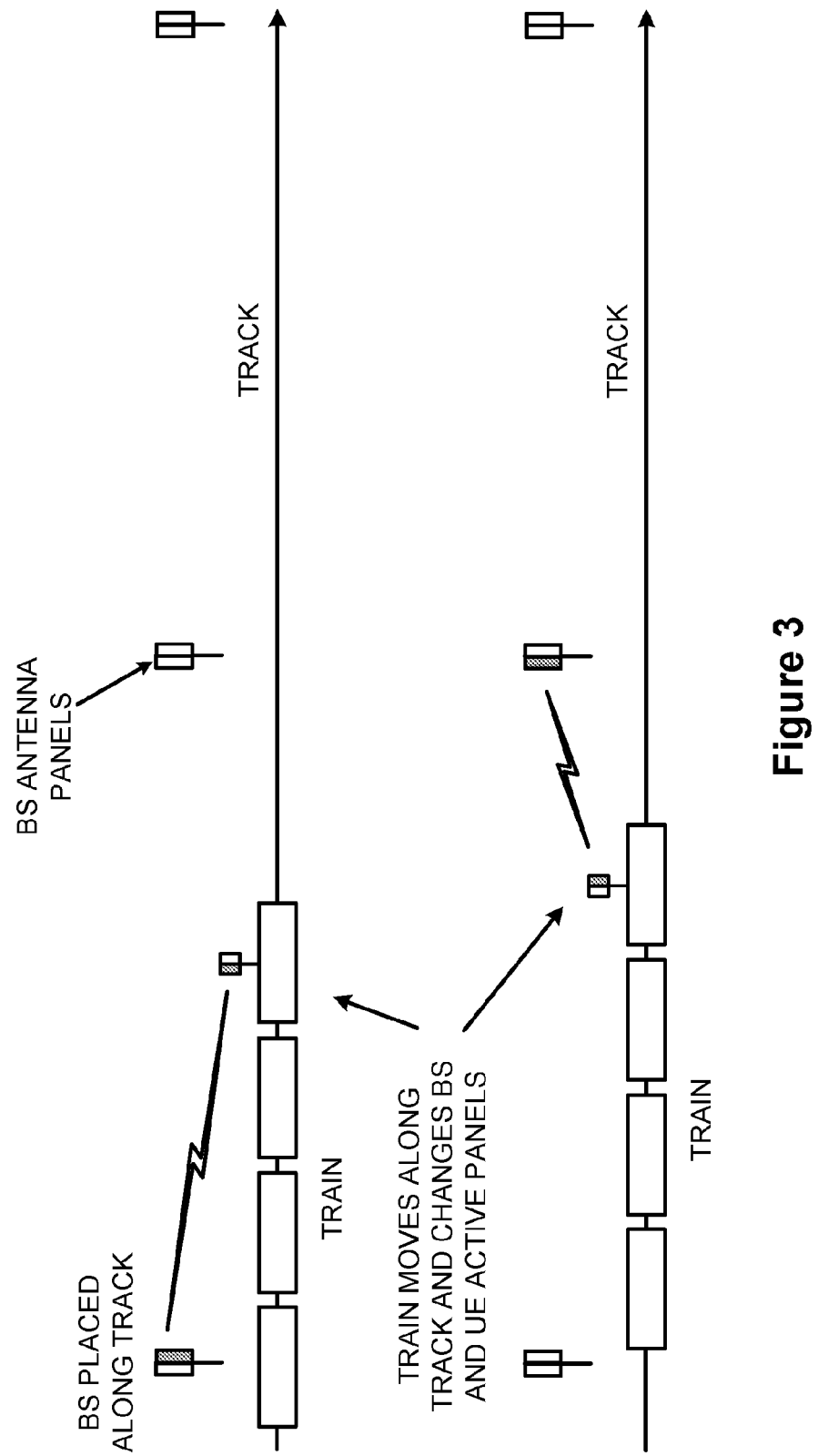
FIG. 3 is an illustration of a change of BS and UE panels for bi-directional operation when between base stations.
Figure 4:
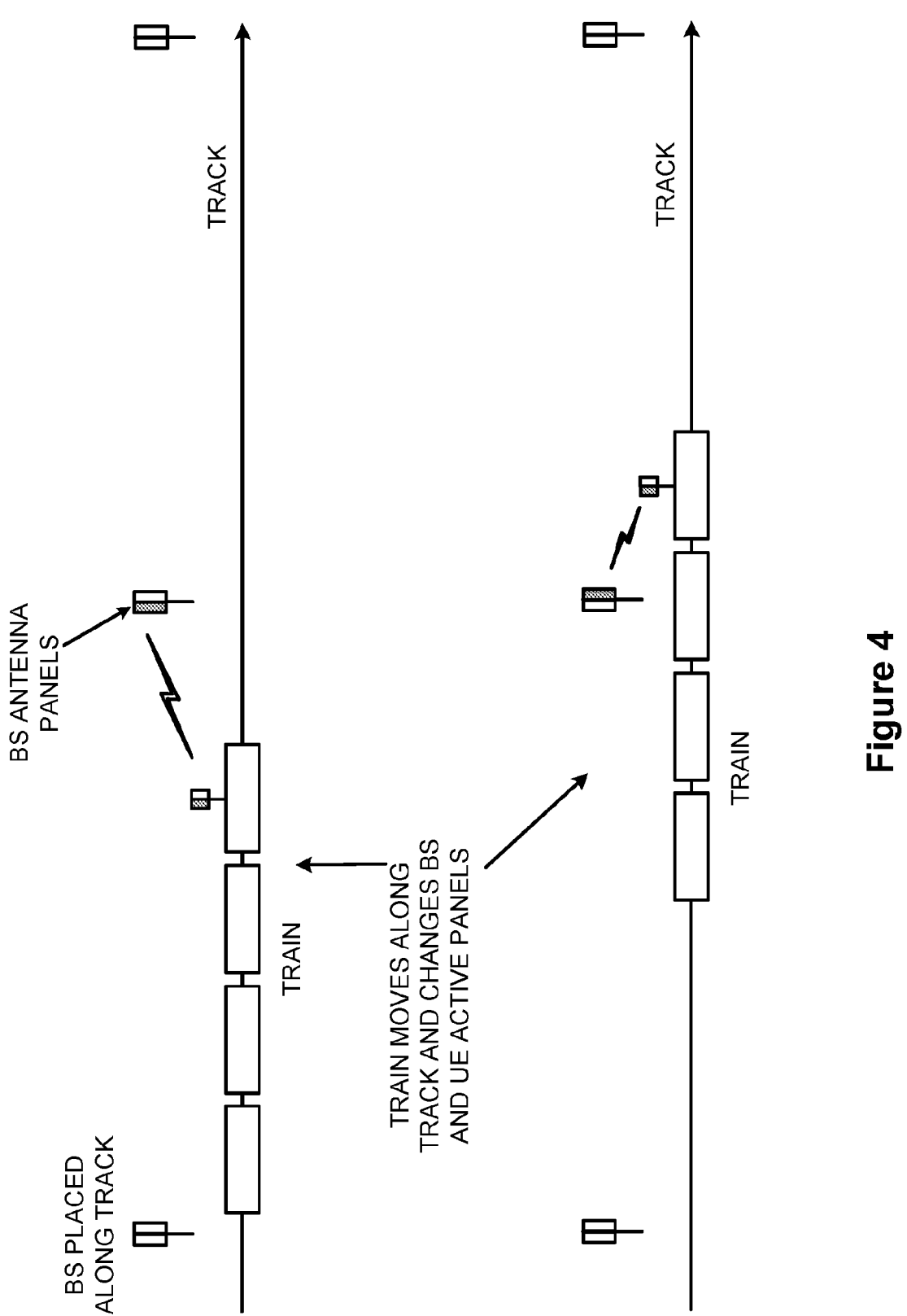
FIG. 4 is an illustration of a change of BS and UE panels for bi-directional operation when passing a base station'
Figure 5:
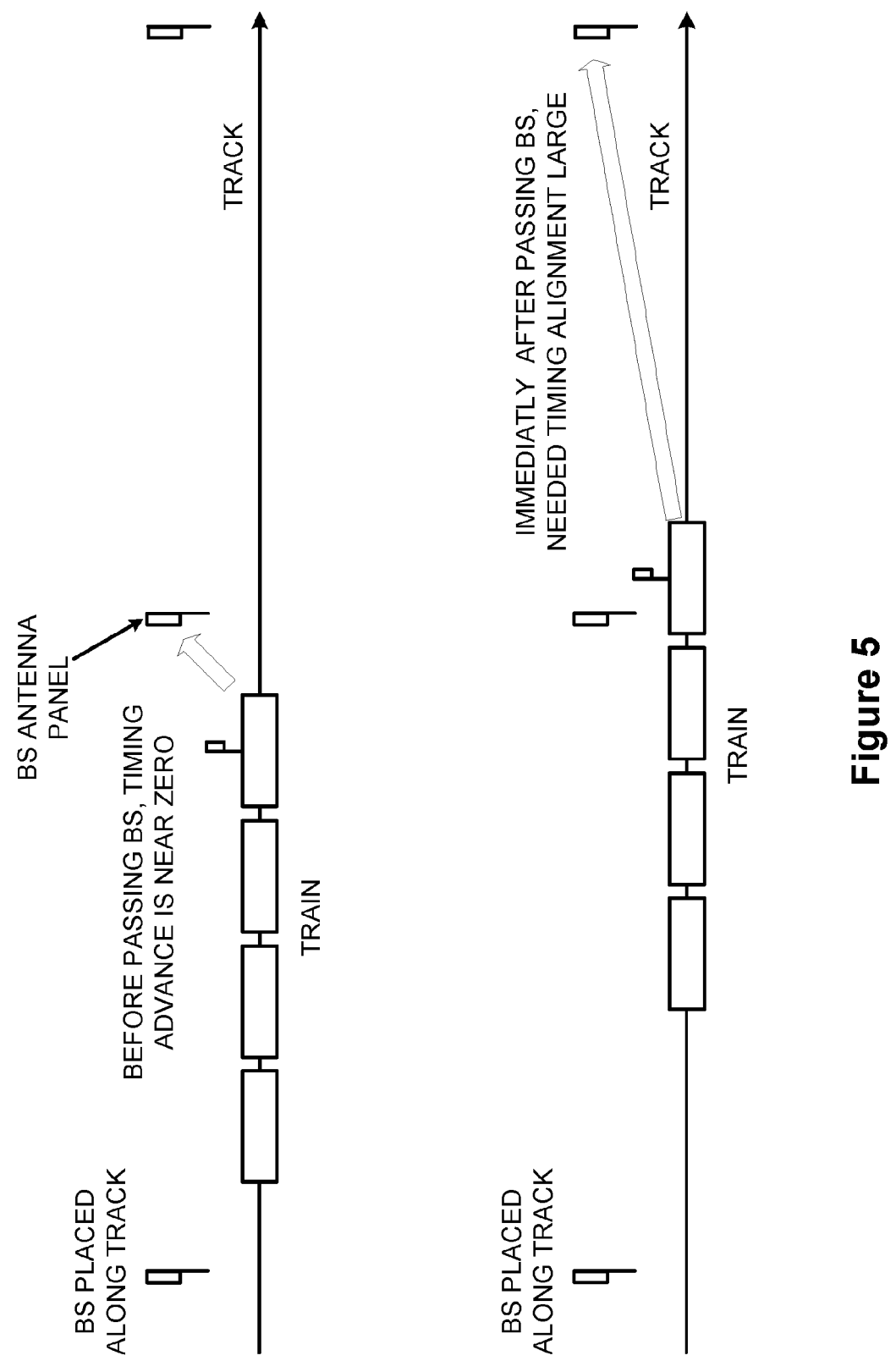
FIG. 5 is an illustration of the need for immediate change of the timing advance for uni-directional operation.
Figure 6:
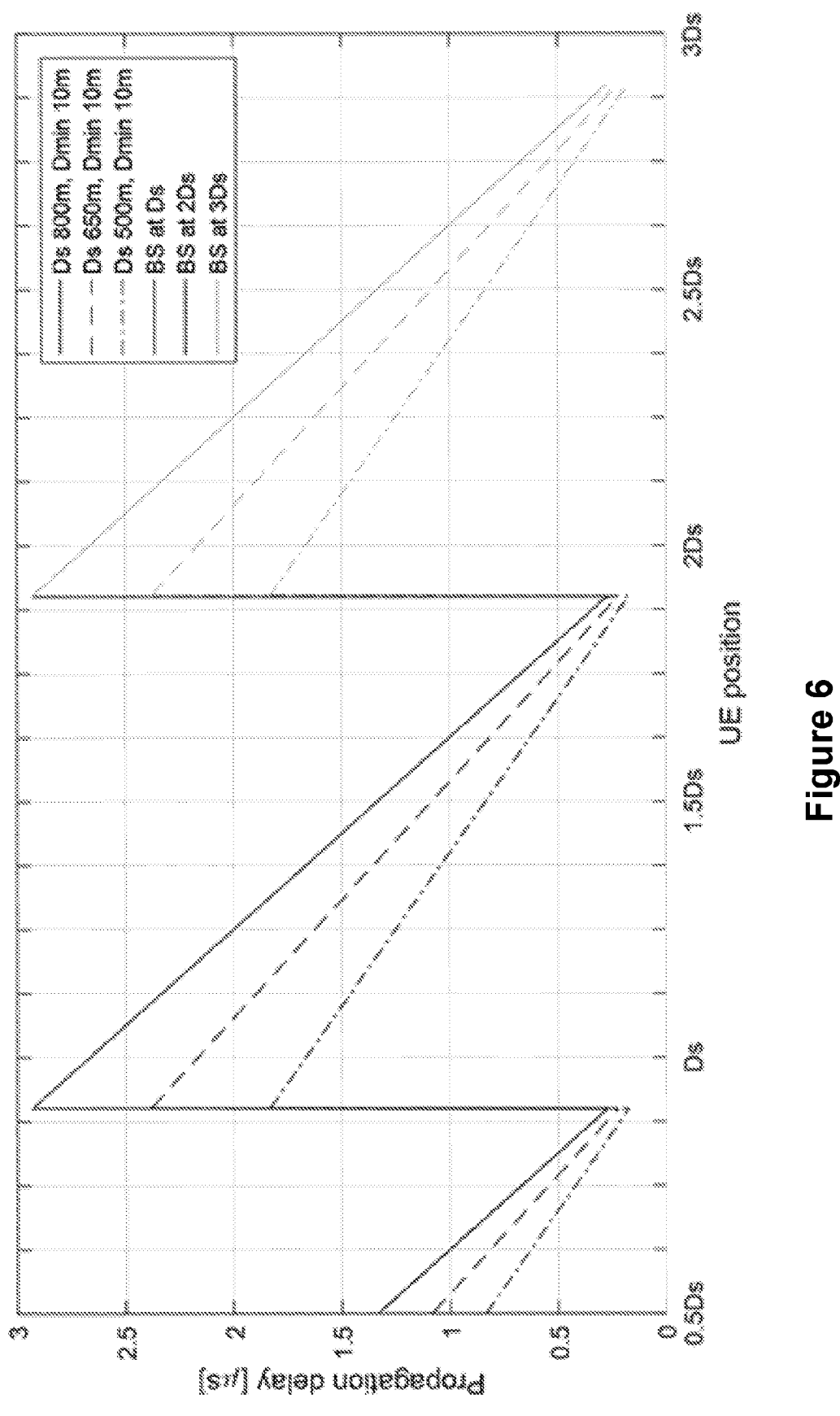
FIG. 6 is an illustration of propagation delay for serving beam in a uni-directional deployment illustrating timing jumps when switching serving beam near the BS.
Figure 7:
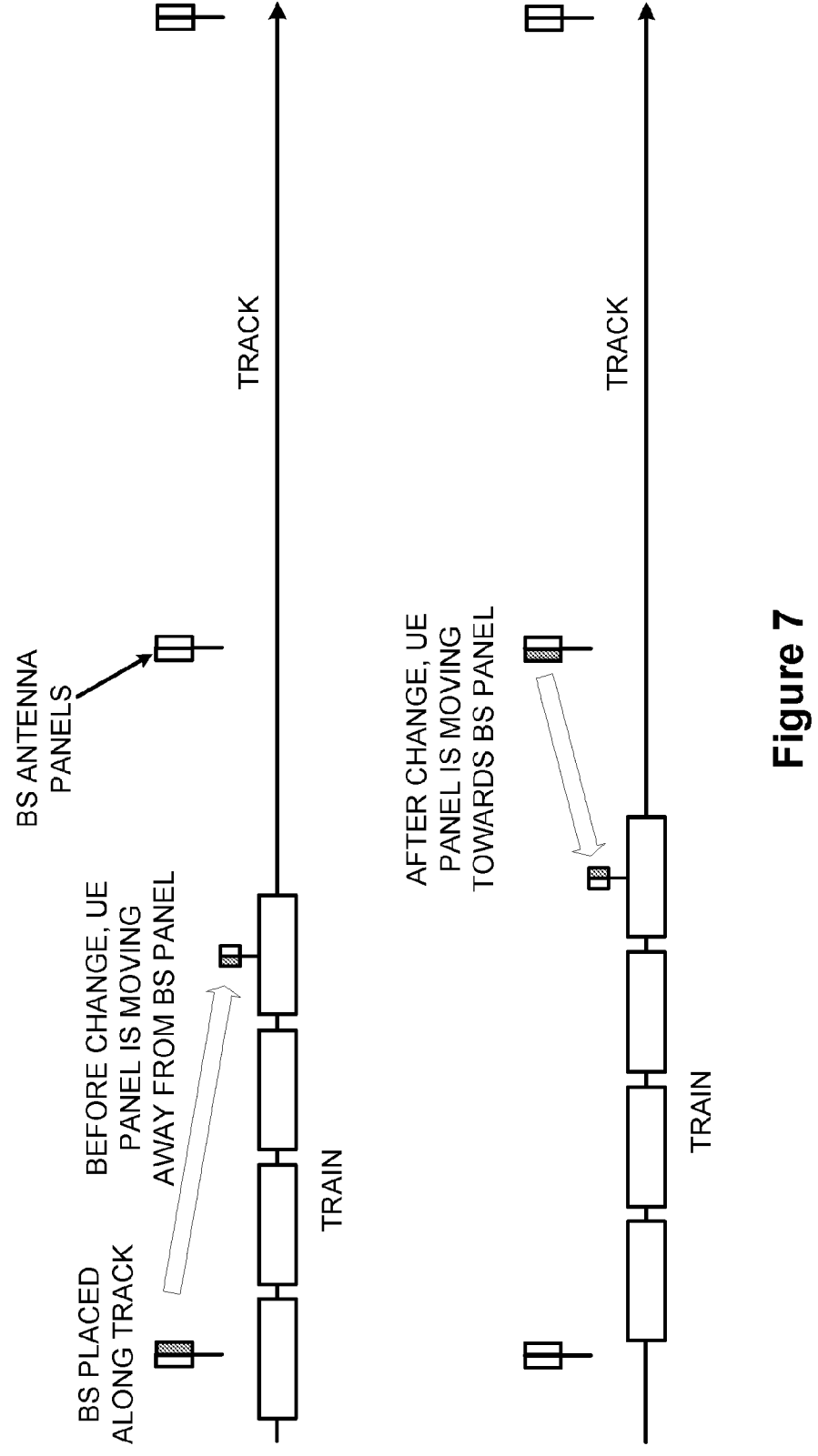
FIG. 7 illustrates an example of a change in direction/Doppler when between BS for bi-directional operation.
Figure 8:
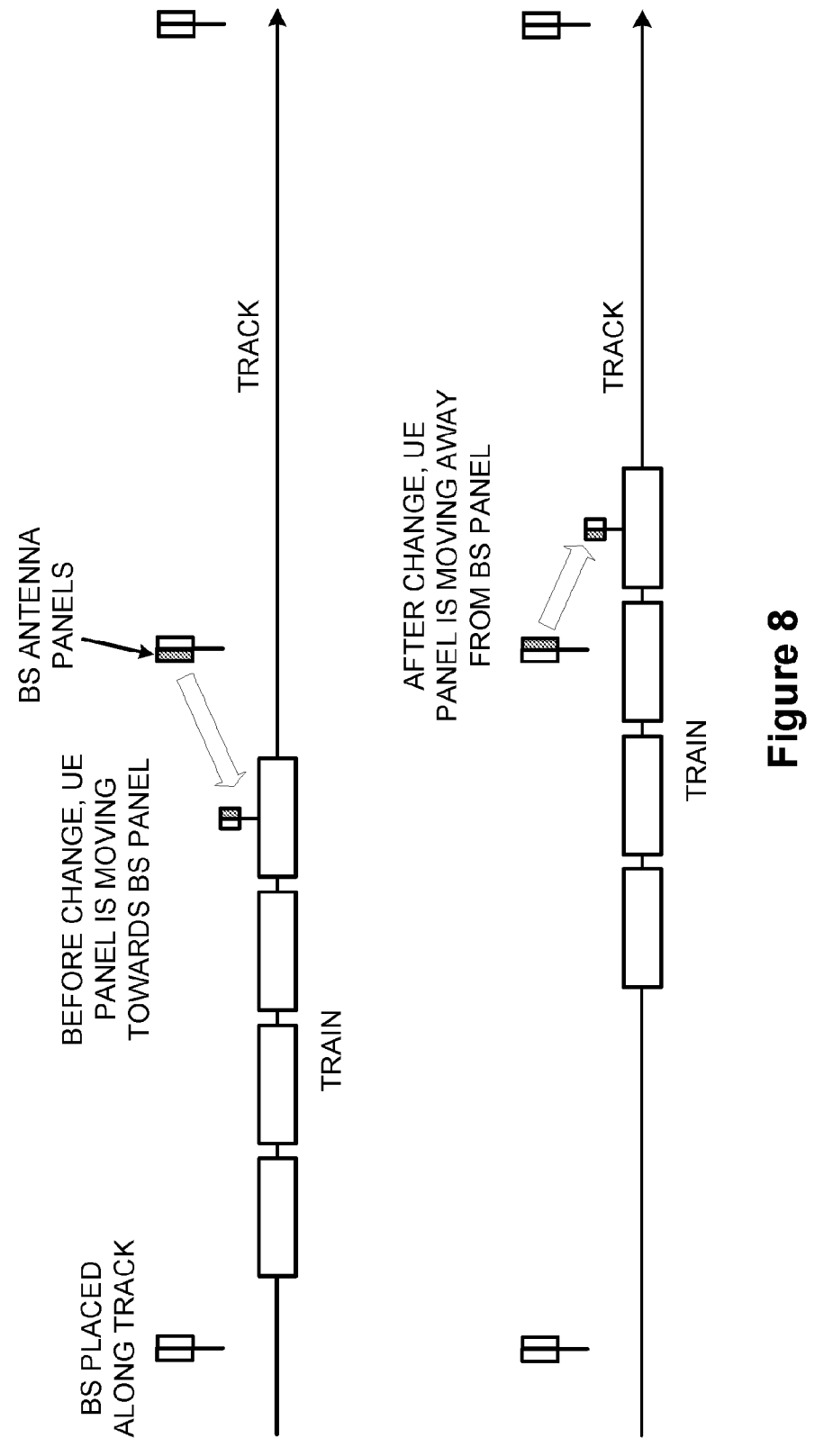
FIG. 8 illustrates an example of a change in direction/Doppler when passing BS for bi-directional operation.
Figure 9:
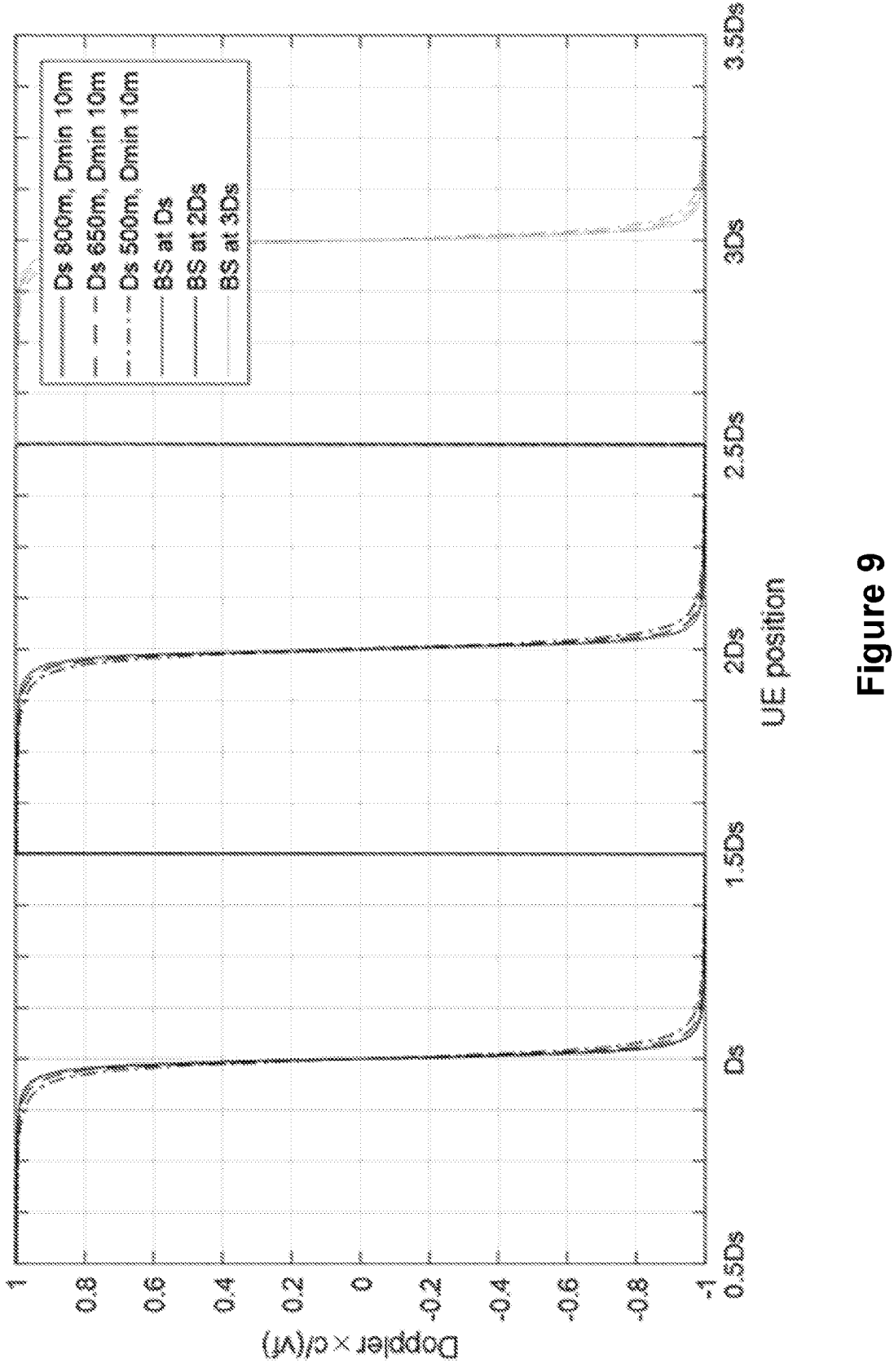
FIG. 9 illustrates an example of a Doppler shift for a serving beam in a bi-directional deployment where the Doppler shift alternates when switching serving beam midways between BSs and when passing a BS.
Figure 10:
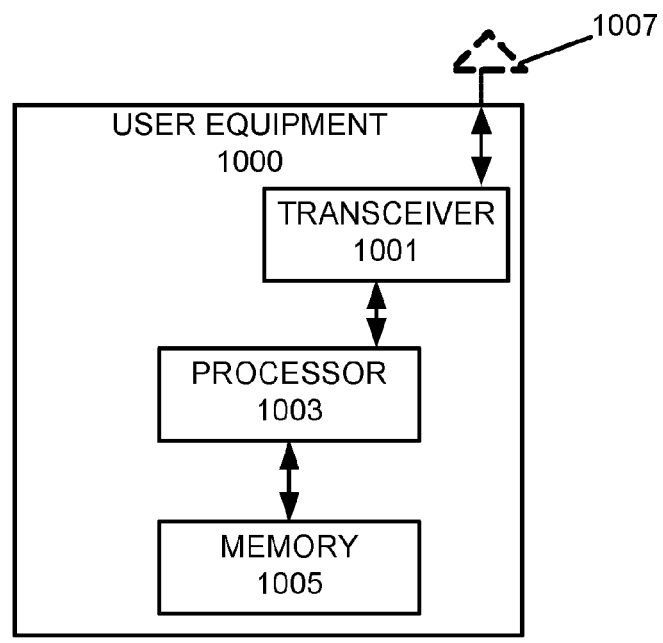
FIG. 10 is a block diagram illustrating a wireless device UE according to some embodiments of inventive concepts.

Prior to describing various embodiments of inventive concepts, FIG. 10 is a block diagram illustrating elements of a user equipment (UE) 1000 (also referred to as a mobile terminal, a mobile communication terminal, a wireless device, a wireless communication device, a wireless terminal, mobile device, a wireless communication terminal, a user equipment node/terminal/device, etc.) configured to provide wireless communication according to embodiments of inventive concepts. (UE 1000 may be provided, for example, as discussed below with respect to wireless device 2010 of FIG. 20, UE 2100 of FIG. 21, virtualization hardware 2330 and virtual machine 2240 of FIG. 22, UEs 2391, 2392 of FIG. 23, and UE 2430 of FIG. 24, all of which should be considered interchangeable in the examples and embodiments described herein and be within the intended scope of this disclosure, unless otherwise noted.) As shown, UE 1000 may include an antenna 1007 (e.g., corresponding to antenna 2011 of FIG. 20 and/or antenna 22225 of FIG. 22), and transceiver circuitry 1001 (also referred to as a transceiver, e.g., corresponding to interface 2014 of FIG. 20, interfaces 2105, 2109, 2111, transmitter 2133 and receiver 2135 of FIG. 21, transmitter 22210 and receiver 22220 of FIG. 22, and radio interface 2437 of FIG. 24) including a transmitter and a receiver configured to provide uplink and downlink radio communications with a base station(s) (e.g., corresponding to network node 2060 of FIG. 20, also referred to as a RAN node) of a radio access network. Communication device UE may also include processing circuitry 1003 (also referred to as a processor, e.g., corresponding to processing circuitry 2020 of FIG. 20, processor 2101 of FIG. 21, processing circuitry 2260 of FIG. 22, and processing circuitry 2228 of FIG. 24) coupled to the transceiver circuitry, and memory circuitry 1005 (also referred to as memory, e.g., corresponding to device readable medium 2030 of FIG. 20 and or memory 2290 of FIG. 22) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that separate memory circuitry is not required. Communication device UE may also include an interface (such as a user interface) coupled with processing circuitry 1003, and/or communication device UE may be incorporated in a vehicle.

As discussed herein, operations of communication device UE may be performed by processing circuitry 1003 and/or transceiver circuitry 1001. For example, processing circuitry 1003 may control transceiver circuitry 1001 to transmit communications through transceiver circuitry 1001 over a radio interface to a radio access network node (also referred to as a base station) and/or to receive communications through transceiver circuitry 1001 from a RAN node over a radio interface. Moreover, modules may be stored in memory circuitry 1005, and these modules may provide instructions so that when instructions of a module are executed by processing circuitry 1003, processing circuitry 1003 performs respective operations (e.g., operations discussed below with respect to Example Embodiments relating to wireless communication devices). According to some embodiments, a communication device UE 1000 and/or an element(s)/function(s) thereof may be embodied as a virtual node/nodes and/or a virtual machine/machines.

Figure 11:
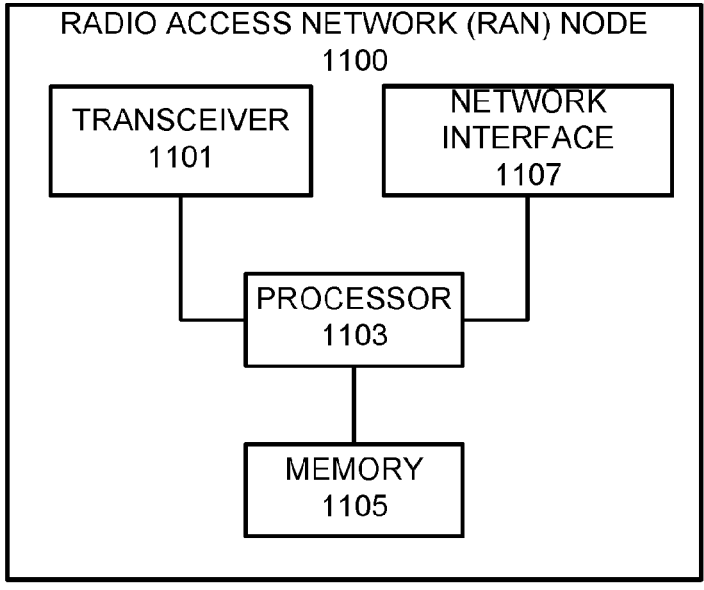
FIG. 11 is a block diagram illustrating a radio access network RAN node (e.g., a base station eNB/gNB) according to some embodiments of inventive concepts.

FIG. 11 is a block diagram illustrating elements of a radio access network RAN node 1100 (also referred to as a network node, base station, eNodeB/eNB, gNodeB/gNB, etc.) of a Radio Access Network (RAN) configured to provide cellular communication according to embodiments of inventive concepts. (RAN node 1100 may be provided, for example, as discussed below with respect to network node 2060 of FIG. 20, virtual hardware 2230 or virtual machine 2240 of FIG. 22, base stations 2312A, 2312B, and 2312C of FIG. 23 and/or base station 2420 of FIG. 24, all of which should be considered interchangeable in the examples and embodiments described herein and be within the intended scope of this disclosure, unless otherwise noted.) As shown, the RAN node may include transceiver circuitry 1101 (also referred to as a transceiver, e.g., corresponding to portions of interface 2090 of FIG. 20 and/or portions of radio interface 2427 of FIG. 24) including a transmitter and a receiver configured to provide uplink and downlink radio communications with mobile terminals. The RAN node may include network interface circuitry 1107 (also referred to as a network interface, e.g., corresponding to portions of interface 2090 of FIG. 20 network interfaces 2270, 2280 of FIG. 22, and/or portions of communication interface 2426 of FIG. 24) configured to provide communications with other nodes (e.g., with other base stations) of the RAN and/or core network CN. The network node may also include processing circuitry 1103 (also referred to as a processor, e.g., corresponding to processing circuitry 2070 of FIG. 20 processing circuitry 2260 of FIG. 22 and/or processing circuitry 2428 of FIG. 24) coupled to the transceiver circuitry, and memory circuitry 1105 (also referred to as memory, e.g., corresponding to device readable medium 2080 of FIG. 20 and/or memory 2290 of FIG. 22) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that a separate memory circuitry is not required.

As discussed herein, operations of the RAN node may be performed by processing circuitry 1103, network interface 1107, and/or transceiver 1101. For example, processing circuitry 1103 may control transceiver 1101 to transmit downlink communications through transceiver 1101 over a radio interface to one or more mobile terminals UEs and/or to receive uplink communications through transceiver 1101 from one or more mobile terminals UEs over a radio interface. Similarly, processing circuitry 1103 may control network interface 1107 to transmit communications through network interface 1107 to one or more other network nodes and/or to receive communications through network interface from one or more other network nodes. Moreover, modules may be stored in memory 1105, and these modules may provide instructions so that when instructions of a module are executed by processing circuitry 1103, processing circuitry 1103 performs respective operations (e.g., operations discussed below with respect to Example Embodiments relating to RAN nodes). According to some embodiments, RAN node 1100 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 12:
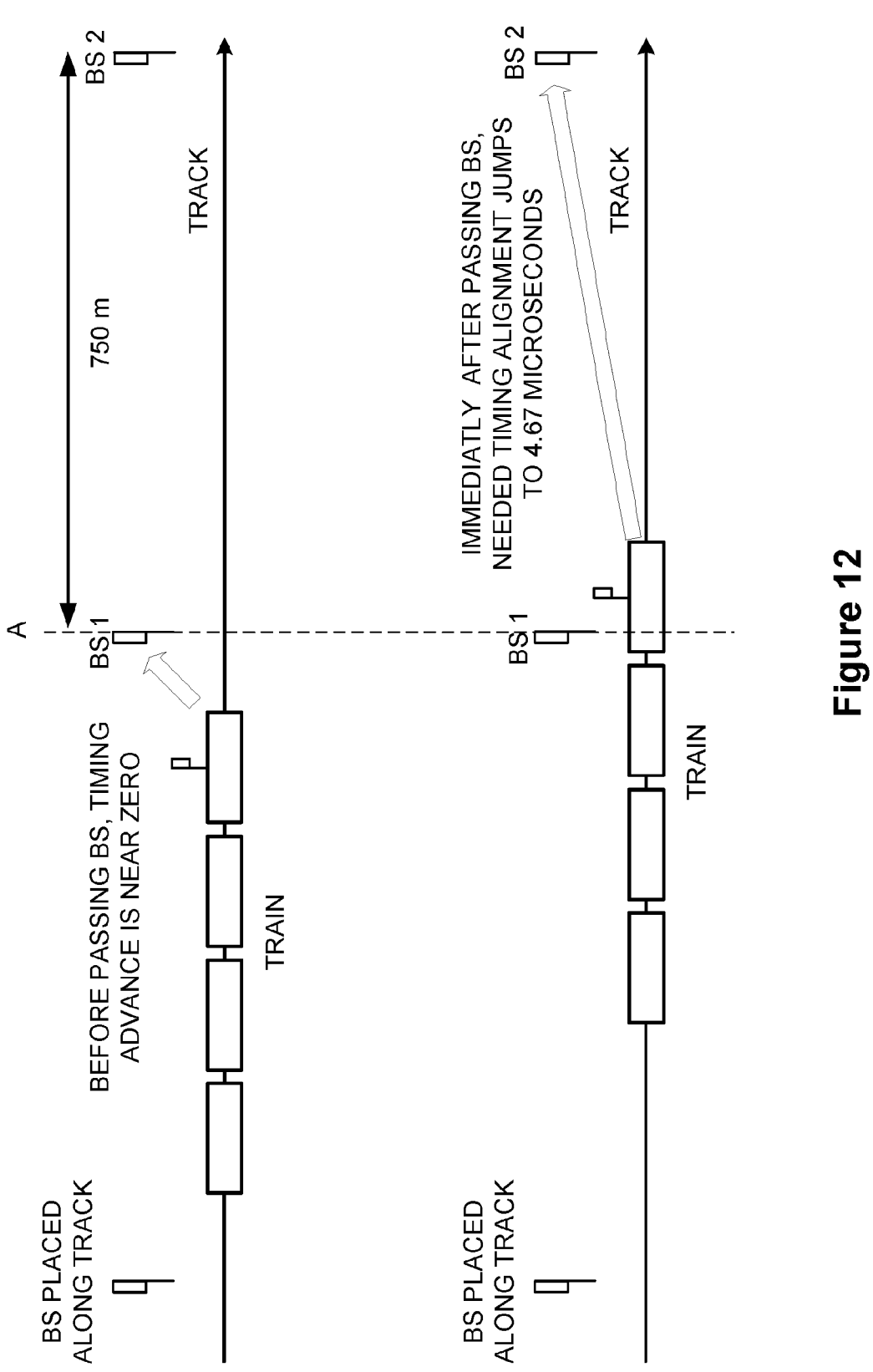
FIG. 12 is an illustration of switching timing advance for wireless communications in a uni-directional high speed train deployment according to some embodiments of inventive concepts.

To describe some embodiments of inventive concepts in a uni-directional HST deployment, the BSs are located 10 m from the trackside and 750 m apart as illustrated in FIG. 12, where the HST train is initially moving towards BS1 in the direction towards BS2.

Turning to FIG. 12, at a call setup (i.e. when the UE starts communicating with the network), the network signals to the UE 1000 the maximum timing advance, which is 4.67 microseconds based on the separation between BSs. Although in this example the network signals the maximum expected timing advance, in other implementations the UE 1000 may obtain the information by other means; for example, by inspection of timing advance at the point of panel/BS change or pre-configuration on a previous occasion. In case the UE 1000 would be moving away from the BS in the direction of pointing, the UE 1000 would be able to simply reset the timing advance to zero on change of BS.

In this example illustrated in FIG. 12, signaling is provided to the UE 1000 in advance that the UE 1000 is in an HST network. In other implementations of inventive concepts, there may not be such signaling.

Before reaching point A, the UE 1100 transmits towards BS 1. Since the UE 1100 is close to BS 1, the timing advance will be low.

After point A, the UE 1000 has passed BS 1 and the network switches to using BS 2 to serve the UE 1000. The UE 1000 is aware of the switch due to a TCI (transmission configuration indicator) switch or handover in this implementation. When the switch occurs, the UE 1000 immediately changes its timing advance to the maximum value (i.e. 4.67 microseconds).

Thus, the UE 1000 changes the timing advance based on implicit knowledge that the serving BS and panel has changed. In other implementations, the network may explicitly signal to the UE 1000 that due to the change in panel, the timing advance should be changed.

FIG. 13 is a flowchart of operations the UE 1000 performs. In the description that follows, while the UE may be any of the UE 1000, wireless device 2010, the UE 2100, UEs 2391, 2392, virtual hardware 2230, virtual machine 2240, or UE 2430, the UE 1000 shall be used to describe the functionality of the operations of the UE. Operations of the UE 1000 (implemented using the structure of the block diagram of FIG. 10) will now be discussed with reference to the flow chart of FIG. 13 according to some embodiments of inventive concepts. For example, modules may be stored in memory 1005 of FIG. 10, and these modules may provide instructions so that when the instructions of a module are executed by respective communication device processing circuitry 1003, processing circuitry 1003 performs respective operations of the flow chart.

Turning to FIG. 13, in block 1301, the processing circuitry 1003 determines that the UE is in a high speed train, HST, network, wherein the HST network is a uni-directional network. In some embodiments, the processing circuitry 1003 determines the UE in in the HST network by receiving an indication that the UE is in the HST network.

In block 1303, the processing circuitry 1003 obtains a maximum timing advance, TA, for wireless communications to apply for serving base station, BS, switching. In some embodiments, the processing circuitry 1003 obtains the maximum TA by receiving the maximum TA from the HST network. In other embodiments, the processing circuitry 1003 obtains the maximum TA by inspection of timing advance at the point of panel/BS change on a previous occasion. In yet other embodiments, the processing circuitry 1003 obtains the maximum TA by a pre-configuration of maximum TA on a previous occasion.

In block 1305, the processing circuitry 1003 updates the TA for wireless communications according to TA commands as the UE 100 proceeds along the track.

In block 1307, the processing circuitry 1003 determines that the BS panel serving the UE 1000 has switched to a new BS along the track.

In some embodiments, the processing circuitry 1003 determines that the BS panel serving the UE has switched based on a transmission configuration indicator, TCI, switch. In other embodiments, the processing circuitry 1003 determines that the BS panel serving the UE has switched based on a handover of the UE to the next BS. In further embodiments, the processing circuitry 1003 determines that the BS panel serving the UE has switched based on receiving a signal indicating the change in the BS panel serving the UE Responsive to determining that the BS panel serving the UE 1000 has switched to the new BS panel, the processing circuitry 1103 sets (1309) the TA to a minimum TA for wireless communications or to the maximum TA for wireless communications based on a direction of travel of the HST with respect to the new BS panel.

For example, the processing circuitry 1003 sets the TA to the maximum TA responsive to the HST traveling towards the new BS panel. The processing circuitry 1003 sets the TA to the minimum TA responsive to the HST traveling away from the new BS panel.

Thus, if the BS antenna panels point in the same direction the HST is traveling:

The train will pass a BS1 and come into view of the BS1 panel when the train is close to BS1. As the train moves away from BS1, the distance from BS1 increases and the needed TA will steadily increase.

The train will approach a BS2, but as long as the train is still behind the panel of BS2, it will communicate with BS1 with large TA.

Immediately after the train passes the panel of BS2, the train will communicate to BS2. The TA needs to be reset to minimum.

If the BS panels all point in the opposite direction of the direction of train travel:

The train will move towards a BS1 and the distance to BS1 and TA will steadily decrease.

As soon as the train has moved from bring in front of to being behind the panel of BS1 then the train UE will start to communicate to BS2 (whose panel is pointing towards the train). At this point, the train is still close to BS1 but far from BS2 and so the TA needs to be set to maximum.

Various operations from the flow chart of FIG. 13 may be optional with respect to some embodiments of communication devices and related methods. Regarding methods of example embodiment 1 (set forth below), for example, operations of block 1301 of FIG. 13 may be optional.

Figure 14:
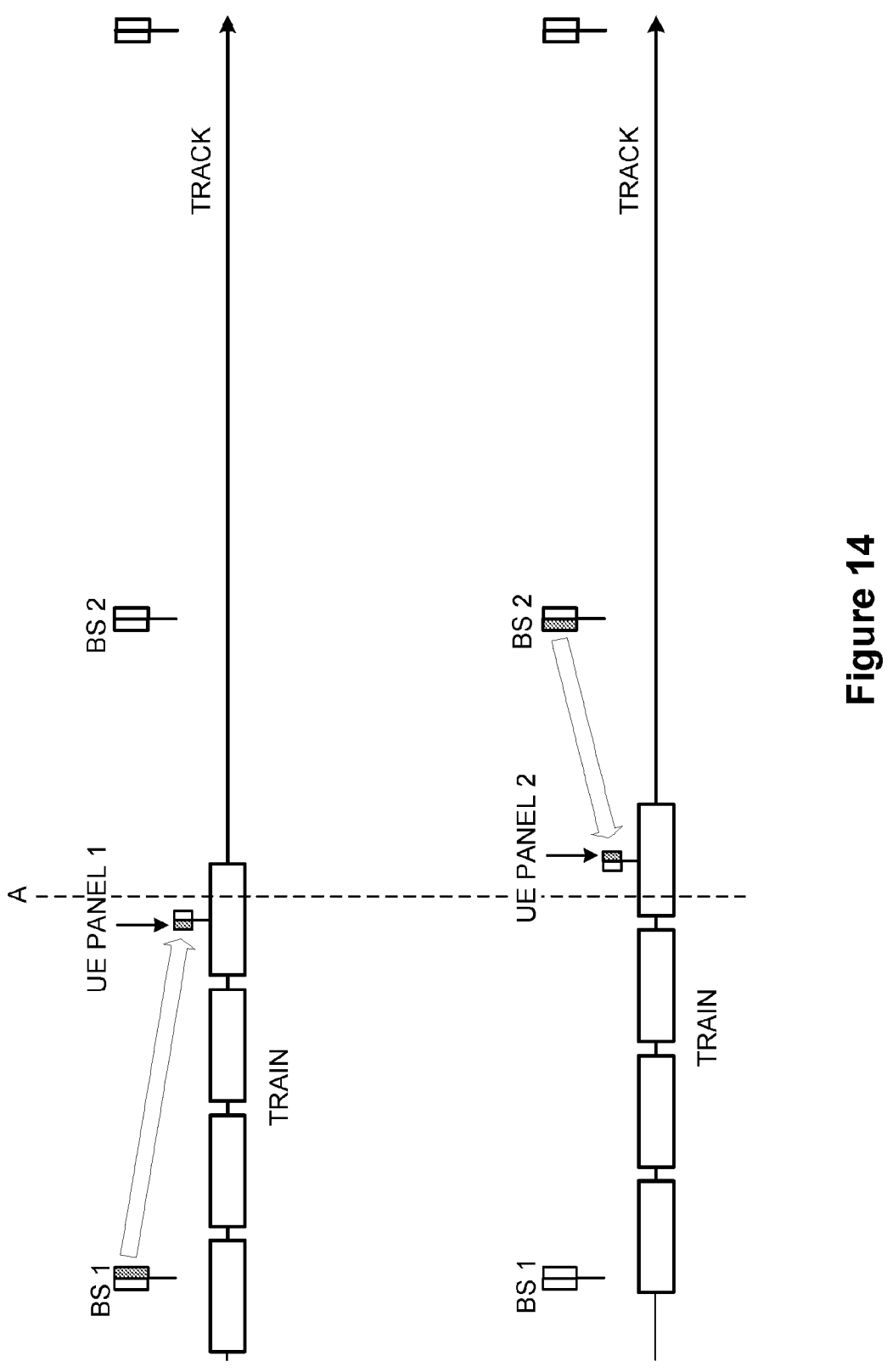
FIG. 14 is an illustration of reversing an assumption of Doppler shift for wireless communications in a bi-directional high speed train deployment according to some embodiments of inventive concepts.

FIG. 14 illustrates some embodiments of inventive concepts in a bi-directional HST deployment.

As the UE 1000 approaches point A, the UE 1000 is served by BS 1 and uses panel 1 to transmit and receive. The UE 1000 will have measured and assume a Doppler shift, $\Delta f$ relating to the speed of the train. At point A, the serving BS is switched to BS 2 and the UE 1000 switches its' receive panel to panel 2. According to embodiments of inventive concepts, the UE receiver immediately switches its assumption on Doppler from $\Delta f$ to $-\Delta f$ when it switches the panel to panel 2.

One issue that can occur with conventional UEs is that the timing reference is based on signals received on the downlink. The UE 1000 tunes its demodulation frequency to minimize any deviation to the frequency of the received signal. Hence in a conventional UE, Doppler shifts are compensated without the UE 1000 knowing to what extent it has compensated for Doppler shifts, and to what extent it has compensated for other factors, such as temperature and its impact on the local oscillator. A UE 1000 that is operating in a NR FR2 high speed train deployment may use an additional frequency reference source which is independent of the signal received from the BS, for knowing e.g. the nominal frequency and thereby becoming aware of to what extent Doppler is being compensated in the used demodulation frequency. The additional frequency source may be provided e.g. by the onboard operation control system for the train, by GPS, or e.g. by some high-grade standalone frequency source. An example of this is a UE that is configured to receive on carrier frequency FC. The UE tunes in to signals received on the downlink, and thinks it has tuned its demodulation frequency to FC, but in fact due to Doppler shift, it has tuned its frequency to FC'=FC+$\Delta f$. When the UE carries out frequency offset estimation between demodulation frequency FC' and FRef, where FRef is based on an accurate frequency source that is not subjected to Doppler shifts, the UE finds out that the used demodulation frequency FC' deviates from FC by $\Delta f$.

FIG. 15 is a flowchart of operations the UE 1000 performs in the bi-directional HST network. In the description that follows, while the UE may be any of the UE 1000, wireless device 2010, the UE 2100, UEs 2391, 2392, virtual hardware 2230, virtual machine 2240, or UE 2430, the UE 1000 shall be used to describe the functionality of the operations of the UE. Operations of the UE 1000 (implemented using the structure of the block diagram of FIG. 10) will now be discussed with reference to the flow chart of FIG. 15 according to some embodiments of inventive concepts. For example, modules may be stored in memory 1005 of FIG. 10, and these modules may provide instructions so that when the instructions of a module are executed by respective communication device processing circuitry 1003, processing circuitry 1003 performs respective operations of the flow chart.

Turning to FIG. 15, in block 1501, the processing circuitry 1003 determines that the UE is in a bi-directional high speed train, HST, network. In some embodiments, the processing circuitry 1003 determines the UE in in the HST network by receiving an indication that the UE is in the HST network.

In block 1503, the processing circuitry 1003 determines a Doppler shift relating to a speed of the HST. In some embodiments, the processing circuitry 1003 determines the Doppler shift comprises using a frequency reference source independent of signals received from base stations along a track the UE is traveling along in the bi-directional HST network. In some embodiments, using the frequency reference source independent of signals received from the base stations includes using a frequency source provided by an onboard operation control system for the HST. In other embodiments, using the frequency reference source independent of signals received from the base stations comprises using a frequency source provided by an onboard operation control system for the HST includes comprises using a global positioning system, GPS, to determine the Doppler shift.

In block 1505, the processing circuitry 1003 uses a first base station, BS, panel to transmit and receive wireless communications in the bi-directional HST network based on the Doppler shift.

In block 1507, the processing circuitry 1003 determines that the BS panel serving the UE 1000 has switched to a second panel. In some embodiments, determining that the BS panel serving the UE 1000 has switched to a second BS panel includes determining that the BS panel serving the UE 1000 has switched based on a transmission configuration indicator, TCI, switch. In other embodiments, determining that the BS panel serving the UE 1000 has switched to a second BS panel includes determining that the BS panel serving the UE 1000 has switched based on a handover of the UE 1000 to a next BS. In yet other embodiments, determining that the BS panel serving the UE 1000 has switched to a second BS panel includes receiving a signal indicating the change in the BS panel serving the UE.

In block 1509, the processing circuitry 1003 uses the second panel to transmit and receive wireless communications in the bi-directional HST network based on a reversed Doppler shift.

Various operations from the flow chart of FIG. 15 may be optional with respect to some embodiments of communication devices and related methods. Regarding methods of example embodiment 12 (set forth below), for example, operations of block 1501 of FIG. 15 may be optional.

FIG. 16 describes UE operations in various embodiments where the UE 1000 maintains one Doppler-compensated demodulation frequency (or frequency correction) for use with the forward-pointing antenna panel, and another Doppler-compensated demodulation frequency (or frequency correction) for use with the backwards-pointing antenna panel In these various embodiments of inventive concepts, the UE is in a bi-directional deployment. The UE receives signaling to inform it that it is in an HST deployment in this example. In other implementations, the UE may not receive such signaling and may instead be implicitly aware (by means of, for example having been designed as an HST UE).

The UE is aware of that it switches between having transmitting source ahead or from the back. The UE receives signals from ahead using one antenna panel, and signals from back using another antenna panel. The UE maintains one Doppler-compensated demodulation frequency (or frequency correction) for use with the forward-pointing antenna panel, and another Doppler-compensated demodulation frequency (or frequency correction) for use with the backwards-pointing antenna panel. When the UE is having its receive beam switched from forward-pointing direction to backwards-pointing correction, or vice versa, the UE also switches the demodulation frequency (or frequency compensation). "Maintaining" here refers to carrying out frequency offset estimation or automatic frequency correction (AFC) on received signals, and tuning the demodulation frequency correspondingly. When maintaining demodulation frequency (or frequency correction) for forward-pointing antenna panel, the UE does so using signal(s) received with the forward-pointing antenna panel, and vice versa for the backwards-pointing direction.

FIG. 16 is a flowchart of operations the UE 1000 performs in the bi-directional HST network. In the description that follows, while the UE may be any of the UE 1000, wireless device 2010, the UE 2100, UEs 2391, 2392, virtual hardware 2230, virtual machine 2240, or UE 2430, the UE 1000 shall be used to describe the functionality of the operations of the UE. Operations of the UE 1000 (implemented using the structure of the block diagram of FIG. 10) will now be discussed with reference to the flow chart of FIG. 16 according to some embodiments of inventive concepts. For example, modules may be stored in memory 1005 of FIG. 10, and these modules may provide instructions so that when the instructions of a module are executed by respective communication device processing circuitry 1003, processing circuitry 1003 performs respective operations of the flow chart.

Turning to FIG. 16, in block 1601, the processing circuitry 1003 determines that the UE is in a bi-directional high speed train, HST, network. In some embodiments, the processing circuitry 1003 determines the UE in in the HST network by receiving an indication that the UE is in the HST network.

In block 1603, the processing circuitry 1003 maintains a first Doppler-compensated demodulation frequency for use with a forward pointing antenna panel and relating to a speed of a high speed train, HST, for the forward pointing antenna panel. In some embodiments, maintaining the first Doppler-compensated demodulation frequency uses signals only received with the forward pointing antenna panel to maintain the first Doppler-compensated demodulation frequency.

In block 1605, the processing circuitry 1003 maintains a second Doppler-compensated demodulation frequency for use with a backward pointing antenna panel and relating to a speed of a high speed train, HST, for the backward pointing antenna panel. In some embodiments, maintaining the second Doppler-compensated demodulation frequency uses signals only received with the backward pointing antenna panel to maintain the second Doppler-compensated demodulation frequency.

In block 1607, the processing circuitry 1003, responsive to switching to the forward pointing panel, switches to the first Doppler-compensated demodulation frequency in transmitting and receiving wireless communications in the bi-directional HST network.

In block 1609, the processing circuitry 1003, responsive to switching to the backward pointing panel, switches to the second Doppler-compensated demodulation frequency in transmitting and receiving wireless communications in the bi-directional HST network.

Various operations from the flow chart of FIG. 16 may be optional with respect to some embodiments of communication devices and related methods. Regarding methods of example embodiment 21 (set forth below), for example, operations of block 1601 of FIG. 16 may be optional.

Figure 17:
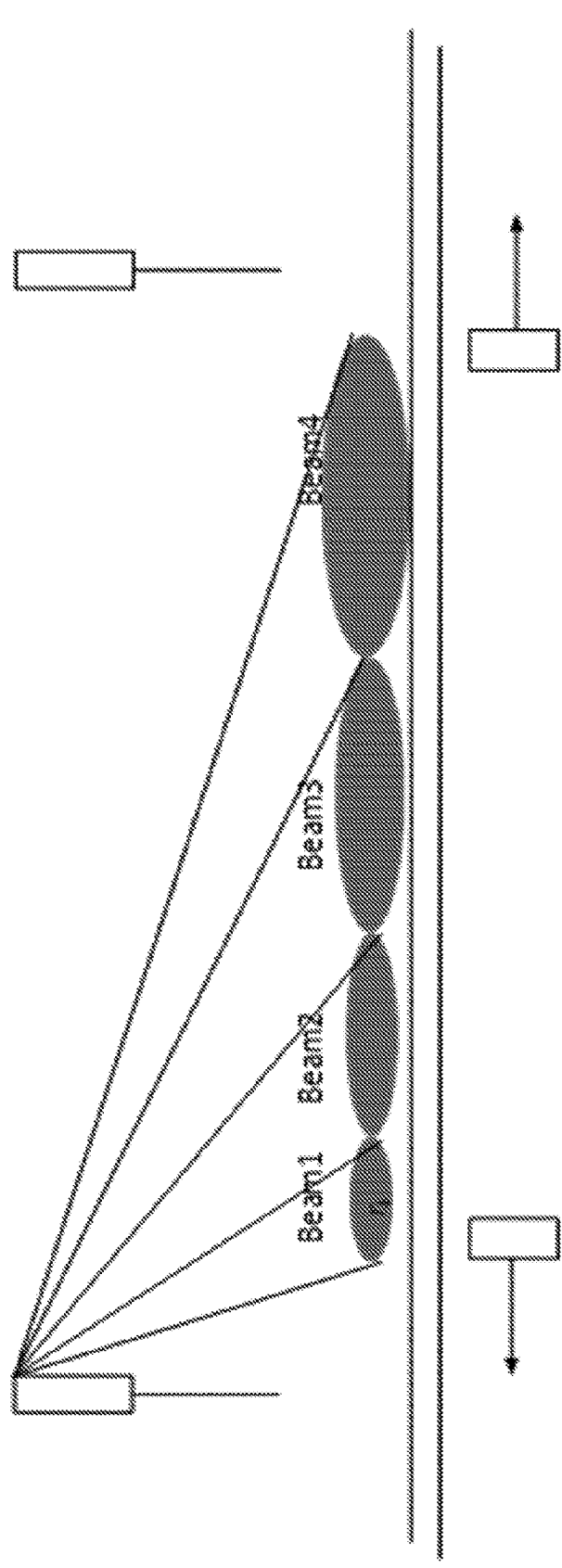
FIG. 17 is an illustration of a bi-directional high speed train deployment with multiple beams covering the track according to some embodiments of inventive concepts.

In a further example, the deployment is bi-directional and the track is covered by several beams from each base station as illustrated in FIG. 17. The UE receives signaling that for certain beam indexes (for example, when transitioning from beam 2 to beam 3 in FIG. 17) there is no need to change the receiver panel or Doppler compensation, whereas for other beam indexes (for example, when transitioning to a beam that is none of the beams 1-4 in FIG. 17) a change in receiver panel and Doppler compensation is needed.

FIG. 18 is a flowchart of operations the UE 1000 performs in the bi-directional HST network. In the description that follows, while the UE may be any of the UE 1000, wireless device 2010, the UE 2100, UEs 2391, 2392, virtual hardware 2230, virtual machine 2240, or UE 2430, the UE 1000 shall be used to describe the functionality of the operations of the UE. Operations of the UE 1000 (implemented using the structure of the block diagram of FIG. 10) will now be discussed with reference to the flow chart of FIG. 19 according to some embodiments of inventive concepts. For example, modules may be stored in memory 1005 of FIG. 10, and these modules may provide instructions so that when the instructions of a module are executed by respective communication device processing circuitry 1003, processing circuitry 1003 performs respective operations of the flow chart.

Turning to FIG. 18, in block 1801, the processing circuitry 1003 determines the processing circuitry 1003 determines that the UE is in a bi-directional high speed train, HST, network. In some embodiments, the processing circuitry 1003 determines the UE in in the HST network by receiving an indication that the UE is in the HST network.

In block 1803, the processing circuitry 1003 receives a signal indicating that for specific beam indexes of transitioning from a first specified beam to a second specified beam of a beam index in the specific beam indexes in the beam indexes of the plurality of beams, a receiver panel and Doppler compensation is not to be changed whereas that for other specific beam indexes of transitioning from third specified bam to a fourth specified beam in the other specific beam indexes, the receiver panel and the Doppler compensation is needed.

In some embodiments, the specific beam indexes and the other specific beam indexes are integrated into a same beam index.

In block 1805, the processing circuitry 1003, responsive to transitioning from the first specified beam to the second specified beam, transitions without changing the receiver panel and the Doppler compensation.

In block 1807, the processing circuitry 1003, responsive to transitioning from the first specified beam to the second specified beam, transitions and changes the receiver panel and the Doppler compensation.

Various operations from the flow chart of FIG. 18 may be optional with respect to some embodiments of communication devices and related methods. Regarding methods of example embodiment 26 (set forth below), for example, operations of block 1801 of FIG. 18 may be optional.

In yet another example of inventive concepts, the UE 100 is configured in advance with the timing advance values associated with each beam. This allows the UE to set its timing advance correctly, even if the UE 1000 has not transmitted in uplink for some time and hence the network has not managed to operate the timing advance control loop for the UE whilst the train has moved.

FIG. 19 illustrates operations the UE 1000 performs when the UE is configured in advance with timing advance values.

Turning to FIG. 19, in block 1901, the processing circuitry 1003 determines the processing circuitry 1003 determines that the UE is in a bi-directional high speed train, HST, network. In some embodiments, the processing circuitry 1003 determines the UE in in the HST network by receiving an indication that the UE is in the HST network.

In block 1903, the processing circuitry 1003 receives a configuration having timing advance values associated with the plurality of beams. The processing circuitry 1003 may have received the configuration in previous occasions.

In block 1905, the processing circuitry 1003 sets the timing advance to the timing advance value associated with a first beam of the plurality of beams presently covering the UE.

In block 1907, the processing circuitry 1003, responsive to the UE transitioning from the first beam to a second beam during movement of the HST, sets the timing advance to the timing advance value associated with the second beam.

Various operations from the flow chart of FIG. 19 may be optional with respect to some embodiments of communication devices and related methods. Regarding methods of example embodiment 30 (set forth below), for example, operations of block 1901 of FIG. 19 may be optional.

As can be seen from the foregoing, various embodiments of inventive concepts have been described that provides approaches to transmission and reception in a UE in which the UE changes characteristics of transmission and/or reception (specifically, at least one of timing advance and/or assumed Doppler shift) based on knowledge that the UE is in a HST deployment combined with the event of changing the panel used for transmission or reception at either the UE, the network or both.

Example embodiments are discussed below.

Embodiment 1. A method performed by a user equipment, UE, (1000, 2100, 2230, 2240, 2391, 2392, 2430) comprising:

obtaining (1303) a maximum timing advance, TA, for wireless communications to apply for a serving base station, BS, switching in a high speed train, HST, network;

updating (1305) the TA for wireless communications according to TA commands as the UE (1000, 2100, 2230, 2240, 2391, 2392, 2430) proceeds along a track in the HST network;

determining (1307) that the BS panel serving the UE (1000, 2100, 2230, 2240, 2391, 2392, 2430) has switched to a new BS panel along the track; and responsive to determining that the BS panel serving the UE (1000, 2100, 2230, 2240, 2391, 2392, 2430) has switched to the new BS panel, setting (1309) the TA to a minimum TA for wireless communication or to the maximum TA for wireless communications based on a direction of travel of the HST with respect to the new BS panel.

Embodiment 2. The method of Embodiment 1, wherein obtaining the maximum TA comprises receiving the maximum TA from the HST network.

Embodiment 3. The method of Embodiment 1, wherein obtaining the maximum TA comprises obtaining the maximum TA by inspection of timing advance at the point of panel/BS change on a previous occasion.

Embodiment 4. The method of Embodiment 1, wherein obtaining the maximum TA comprises obtaining the maximum TA by a pre-configuration of maximum TA on a previous occasion.

Embodiment 5. The method of any of Embodiments 1-4, further comprising determining (1301) that the UE (1000, 2100, 2230, 2240, 2391, 2392, 2430) is in the HST network, the HST network comprising a uni-directional HST network.

Embodiment 6. The method of Embodiment 5 wherein determining that the UE is in the HST network comprises receiving an indication that the UE (1000, 2100, 2230, 2240, 2391, 2392, 2430) is in the HST network.

Embodiment 7. The method of any of Embodiments 1-6, wherein determining that the BS panel serving the UE (1000, 2100, 2230, 2240, 2391, 2392, 2430) has switched to the next BS comprises determining that the BS panel serving the UE (1000, 2100, 2230, 2240, 2391, 2392, 2430) has switched based on a transmission configuration indicator, TCI, switch.

Embodiment 8. The method of any of Embodiments 1-6, wherein determining that the BS panel serving the UE has switched to the next BS comprises determining that the BS panel serving the UE (1000, 2100, 2230, 2240, 2391, 2392, 2430) has switched based on a handover of the UE (1000, 2100, 2230, 2240, 2391, 2392, 2430) to the next BS.

Embodiment 9. The method of any of Embodiments 1-6, wherein determining that the BS panel serving the UE (1000, 2100, 2230, 2240, 2391, 2392, 2430) has switched to the next BS comprises determining that the BS panel serving the UE (1000, 2100, 2230, 2240, 2391, 2392, 2430) has switched based on receiving a signal indicating the change in the BS panel serving the UE (1000, 2100, 2230, 2240, 2391, 2392, 2430).

Embodiment 10. The method of any of Embodiments 1-9 wherein setting (1309) the TA to the minimum TA for wireless communication or to the maximum TA for wireless communications comprises setting the TA to the maximum TA responsive to the HST traveling towards the new BS panel immediately after handover or TCI change.

Embodiment 11. The method of any of Embodiments 1-9 wherein setting (1309) the TA to the minimum TA for wireless communication or to the maximum TA for wireless communications comprises setting the TA to the minimum TA responsive to the HST traveling away from the new BS panel immediately after handover or TCI change.

Embodiment 12. A method performed by a user equipment (1000, 2100, 2230, 2240, 2391, 2392, 2430), UE, comprising:

determining (1503) a Doppler shift relating to a speed of the HST;

using (1505) a first base station, BS, panel to transmit and receive wireless communications in the bi-directional HST network based on the Doppler shift;

determining (1507) that the BS panel serving the UE has switched to a second BS panel;

using (1509) the second panel to transmit and receive wireless communications in the bi-directional HST network based on a reversed Doppler shift.

Embodiment 13. The method of Embodiment 12, further comprising:

determining (1501) that the UE (1000, 2100, 2230, 2240, 2391, 2392, 2430) is in a bi-directional high speed train, HST, network.

Embodiment 14. The method of Embodiment 12 wherein determining that the UE (1000, 2100, 2230, 2240, 2391, 2392, 2430) is in the bi-directional HST network comprises receiving an indication that the UE (1000, 2100, 2230, 2240, 2391, 2392, 2430) is in the bi-directional HST network.

Embodiment 15. The method of any of Embodiments 12-14, wherein determining the Doppler shift comprises using a frequency reference source independent of signals received from base stations along a track the UE (1000,

2100, 2230, 2240, 2391, 2392, 2430) is traveling along in the bi-directional HST network.

Embodiment 16. The method of Embodiment 15, wherein using the frequency reference source independent of signals received from the base stations comprises using a frequency source provided by an onboard operation control system for the HST.

Embodiment 17. The method of Embodiment 15, wherein using the frequency reference source independent of signals received from the base stations comprises using a global positioning system, GPS, to determine the Doppler shift.

Embodiment 18. The method of any of Embodiments 12-17, wherein determining that the BS panel serving the UE (1000, 2100, 4330, 2240, 2391, 2392, 2430) has switched to a second BS panel comprises determining that the BS panel serving the UE (1000, 2100, 2230, 2240, 2391, 2392, 2430) has switched based on a transmission configuration indicator, TCI, switch.

Embodiment 19. The method of any of Embodiments 12-17, wherein determining that the BS panel serving the UE (1000, 2100, 2230, 2240, 2391, 2392, 2430) has switched to the second BS panel comprises determining that the BS panel serving the UE (1000, 2100, 2230, 2240, 2391, 2392, 2430) has switched based on a handover of the UE (1000, 2100, 2230, 2240, 2391, 2392, 2430) to a next BS.

Embodiment 20. The method of any of Embodiments 12-17, wherein determining that the BS panel serving the UE (1000, 2100, 2230, 2240, 2391, 2392, 2430) has switched to the next BS comprises determining that the BS panel serving the UE (1000, 2100, 2230, 2240, 2391, 2392, 2430) has switched based on receiving a signal indicating the change in the BS panel serving the UE (1000, 2100, 2230, 2240, 2391, 2392, 2430).

Embodiment 21. A method performed by a user equipment, UE, (1000, 2100, 2230, 2240, 2391, 2392, 2430) in a bi-directional high speed train, HST, deployment, the method comprising:

maintaining (1603) a first Doppler-compensated demodulation frequency for use with a forward pointing antenna panel and relating to a speed of a high speed train, HST, for the forward pointing antenna panel;

determining (1605) a second Doppler-compensated demodulation frequency for use with a backwards pointing antenna panel and relating to a speed of a high speed train, HST, for a backwards pointing antenna panel;

responsive to switching to the forward pointing panel, switching (1607) to the first Doppler-compensated demodulation frequency in transmitting and receiving wireless communications in the bi-directional HST network; and responsive to switching to the backward pointing panel, switching (1609) to the second Doppler-compensated demodulation frequency in transmitting and receiving wireless communications in the bi-directional HST network.

Embodiment 22. The method of Embodiment 21, further comprising:

determining (1601) that the UE (1000, 2100, 2230, 2240, 2391, 2392, 2430) is in a bi-directional high speed train, HST, network.

Embodiment 23. The method of Embodiment 22 wherein determining that the UE is in the bi-directional HST network comprises receiving an indication that the UE (1000, 2100, 2230, 2240, 2391, 2392, 2430) is in the bi-directional HST network.

Embodiment 24. The method of any of Embodiments 21-23 wherein maintaining the first Doppler-compensated demodulation frequency comprises using signals only received with the forward pointing antenna panel to maintain the first Doppler-compensated demodulation frequency.

Embodiment 25. The method of any of Embodiments 21-24 wherein maintaining the second Doppler-compensated demodulation frequency comprises using signals only received with the backward pointing antenna panel to maintain the second Doppler-compensated demodulation frequency.

Embodiment 26. A method performed by a user equipment, UE, (1000, 2100, 2230, 2240, 2391, 2392, 2430) in a bi-directional high speed train, HST, network having a track covered by a plurality of beams for wireless communications, the method comprising:

receiving (1803) a signal indicating that for specific beam indexes of transitioning from a first specified beam to a second specified beam of a beam index in the specific beam indexes in the beam indexes of the plurality of beams, a receiver panel and Doppler compensation is not to be changed whereas that for other specific beam indexes of transitioning from third specified bam to a fourth specified beam in the other specific beam indexes, the receiver panel and the Doppler compensation is needed;

responsive to transitioning from the first specified beam to the second specified beam, transitioning (1805) without changing the receiver panel and the Doppler compensation; and responsive to transitioning from the third specified beam to the fourth specified beam, transitioning (1807) and changing the receiver panel and the Doppler compensation with the transitioning.

Embodiment 27. The method of Embodiment 26, further comprising:

determining (1801) that the UE (1000, 2100, 2230, 2240, 2391, 2392, 2430) is in a bi-directional high speed train, HST, network.

Embodiment 28. The method of Embodiment 26 wherein determining that the UE (1000, 2100, 2230, 2240, 2391, 2392, 2430) is in the bi-directional HST network comprises receiving an indication that the UE (1000, 2100, 2230, 2240, 2391, 2392, 2430) is in the bi-directional HST network.

Embodiment 29. The method of any of Embodiments 26-28, wherein the specific beam indexes and the other specific beam indexes are integrated into a same beam index Embodiment 30. A method performed by a user equipment, UE, (1000, 2100, 2230, 2240, 2391, 2392, 2430) in a bi-directional high speed train, HST, network having a track covered by a plurality of beams for wireless communications, the method comprising:

receiving (1903) a configuration having timing advance values associated with the plurality of beams;

setting (1905) the timing advance to the timing advance value associated with a first beam of the plurality of beams presently covering the UE;

responsive to the UE (1000, 2100, 2230, 2240, 2391, 2392, 2430) transitioning from the first beam to a second beam during movement of the HST, setting (1907) the timing advance to the timing advance value associated with the second beam.

Embodiment 31. The method of Embodiment 30, further comprising:

determining (1901) that the UE (1000, 2100, 2230, 2240, 2391, 2392, 2430) is in a bi-directional high speed train, HST, network.

Embodiment 32. The method of Embodiment 31 wherein determining that the UE (1000, 2100, 2230, 2240, 2391, 2392, 2430) is in the bi-directional HST network comprises receiving an indication that the UE (1000, 2100, 2230, 2240, 2391, 2392, 2430) is in the bi-directional HST network.

Embodiment 33. A communication device (1000, 2100, 2230, 2240, 2391, 2392, 2430) comprising:

processing circuitry (1003, 2020, 2101, 2260 2438); and memory (1005, 2030, 2115) coupled with the processing circuitry, wherein the memory includes instructions that when executed by the processing circuitry causes the communication device to perform operations according to any of Embodiments 1-32.

Embodiment 34. A communication device (1000, 2100, 2230, 2240, 2391, 2392, 2430) adapted to perform according to any of Embodiments 1-32.

Embodiment 35. A computer program comprising program code to be executed by processing circuitry (1003, 2020, 2101, 2260, 2438) of a communication device (1000, 2100, 2230, 2240, 2391, 2392, 2430), whereby execution of the program code causes the communication device (1000, 2100, 2230, 2240, 2391, 2392, 2430) to perform operations according to any of embodiments 1-32.

Embodiment 36. A computer program product comprising a non-transitory storage medium including program code to be executed by processing circuitry (1003, 2020, 2101, 2260, 2438) of a communication device (1000, 2100, 2230, 2240, 2391, 2392, 2430), whereby execution of the program code causes the communication device (1000, 2100, 2230, 2240, 2391, 2392, 2430) to perform operations according to any of embodiments 1-32.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 20:
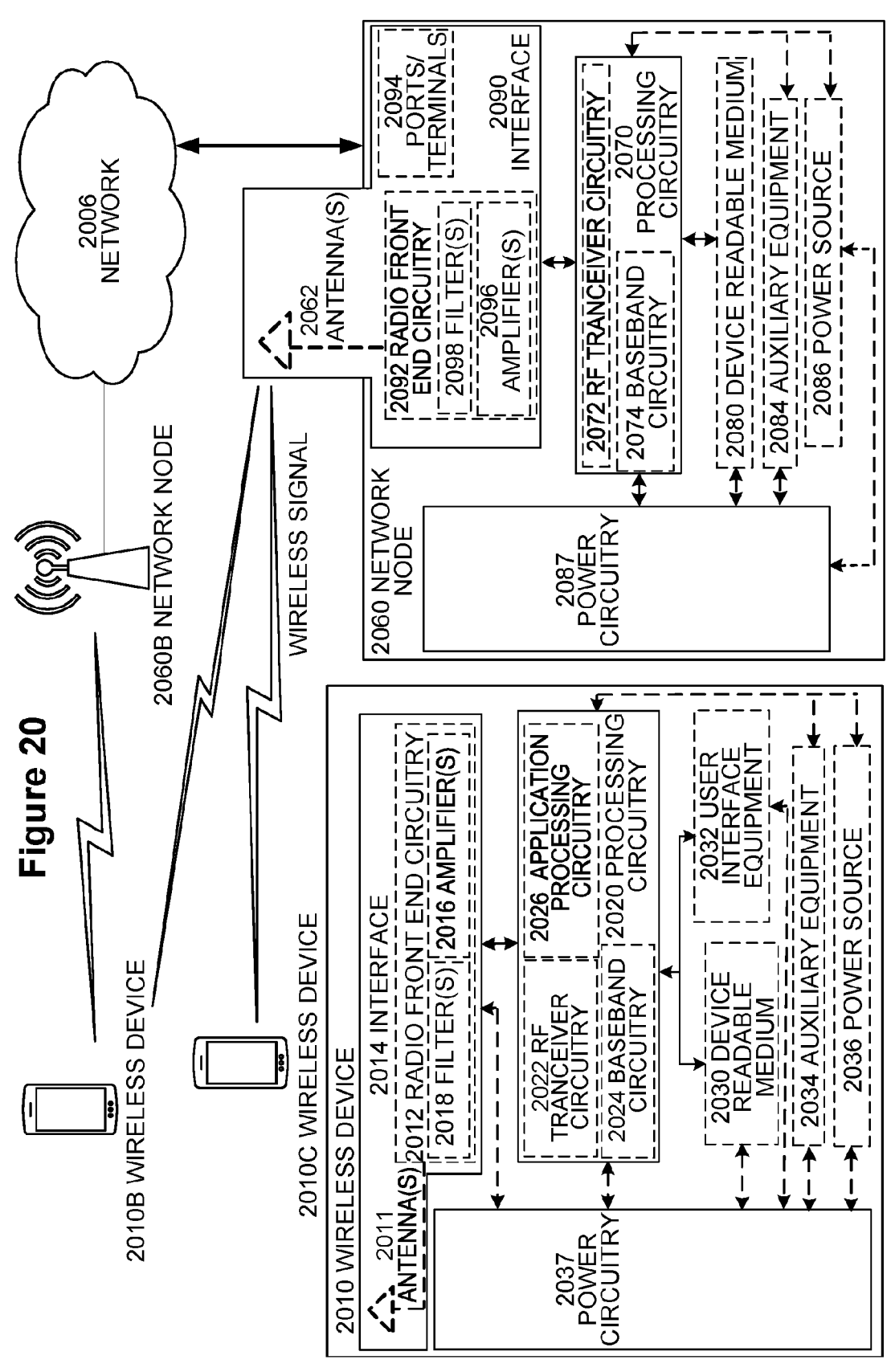
FIG. 20 is a block diagram of a wireless network in accordance with some embodiments.

FIG. 20 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network 2006, network nodes 2060 and 2060B, and WDs 2010,

2010B, and 2010C (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2060 are depicted as single boxes located within a larger box, or nested within multiple boxes, in practice, a network node may comprise multiple different physical components that make up a single illustrated component (e.g., device readable medium 2080 may comprise multiple separate hard drives as well as multiple RAM modules).

Similarly, network node 2060 may be composed of multiple physically separate components (e.g., a NodeB component and a RNC component, or a BTS component and a BSC component, etc.), which may each have their own respective components. In certain scenarios in which network node 2060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2060 may be configured to support multiple radio access technologies (RATs). In such embodiments, some components may be duplicated (e.g., separate device readable medium 2080 for the different RATs) and some components may be reused (e.g., the same antenna 2062 may be shared by the RATs). Network node 2060 may also include multiple sets of the various illustrated components for different wireless technologies integrated into network node 2060, such as, for example, GSM, WCDMA, LTE, NR, WiFi, or Bluetooth wireless technologies. These wireless technologies may be integrated into the same or different chip or set of chips and other components within network node 2060.

Processing circuitry 2070 is configured to perform any determining, calculating, or similar operations (e.g., certain obtaining operations) described herein as being provided by a network node. These operations performed by processing circuitry 2070 may include processing information obtained by processing circuitry 2070 by, for example, converting the obtained information into other information, comparing the obtained information or converted information to information stored in the network node, and/or performing one or more operations based on the obtained information or converted information, and as a result of said processing making a determination.

Processing circuitry 2070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2060 components, such as device readable medium 2080, network node 2060 functionality. For example, processing circuitry 2070 may execute instructions stored in device readable medium 2080 or in memory within processing circuitry 2070. Such functionality may include providing any of the various wireless features, functions, or benefits discussed herein. In some embodiments, processing circuitry 2070 may include a system on a chip (SOC).

In some embodiments, processing circuitry 2070 may include one or more of radio frequency (RF) transceiver circuitry 2072 and baseband processing circuitry 2074. In some embodiments, radio frequency (RF) transceiver circuitry 2072 and baseband processing circuitry 2074 may be on separate chips (or sets of chips), boards, or units, such as radio units and digital units. In alternative embodiments, part or all of RF transceiver circuitry 2072 and baseband processing circuitry 2074 may be on the same chip or set of chips, boards, or units.

In certain embodiments, some or all of the functionality described herein as being provided by a network node, base station, eNB or other such network device may be performed by processing circuitry 2070 executing instructions stored on device readable medium 2080 or memory within processing circuitry 2070. In alternative embodiments, some or all of the functionality may be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060, but are enjoyed by network node 2060 as a whole, and/or by end users and the wireless network generally.

Device readable medium 2080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2070. Device readable medium 2080 may store any suitable instructions, data or information, including a computer program, software, an application including one or more of logic, rules, code, tables, etc. and/or other instructions capable of being executed by processing circuitry 2070 and, utilized by network node 2060. Device readable medium 2080 may be used to store any calculations made by processing circuitry 2070 and/or any data received via interface 2090. In some embodiments, processing circuitry 2070 and device readable medium 2080 may be considered to be integrated.

Interface 2090 is used in the wired or wireless communication of signalling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that may be coupled to, or in certain embodiments a part of, antenna 2062. Radio front end circuitry 2092 comprises filters 2098 and amplifiers 2096. Radio front end circuitry 2092 may be connected to antenna 2062 and processing circuitry 2070. Radio front end circuitry may be configured to condition signals communicated between antenna 2062 and processing circuitry 2070. Radio front end circuitry 2092 may receive digital data that is to be sent out to other network nodes or WDs via a wireless connection. Radio front end circuitry 2092 may convert the digital data into a radio signal having the appropriate channel and bandwidth parameters using a combination of filters 2098 and/or amplifiers 2096. The radio signal may then be transmitted via antenna 2062. Similarly, when receiving data, antenna 2062 may collect radio signals which are then converted into digital data by radio front end circuitry 2092. The digital data may be passed to processing circuitry 2070. In other embodiments, the interface may comprise different components and/or different combinations of components.

In certain alternative embodiments, network node 2060 may not include separate radio front end circuitry 2092, instead, processing circuitry 2070 may comprise radio front end circuitry and may be connected to antenna 2062 without separate radio front end circuitry 2092. Similarly, in some embodiments, all or some of RF transceiver circuitry 2072 may be considered a part of interface 2090. In still other embodiments, interface 2090 may include one or more ports or terminals 2094, radio front end circuitry 2092, and RF transceiver circuitry 2072, as part of a radio unit (not shown), and interface 2090 may communicate with baseband processing circuitry 2074, which is part of a digital unit (not shown).

Antenna 2062 may include one or more antennas, or antenna arrays, configured to send and/or receive wireless signals. Antenna 2062 may be coupled to radio front end circuitry 2092 and may be any type of antenna capable of transmitting and receiving data and/or signals wirelessly. In some embodiments, antenna 2062 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2062 may be separate from network node 2060 and may be connectable to network node 2060 through an interface or port.

Antenna 2062, interface 2090, and/or processing circuitry 2070 may be configured to perform any receiving operations and/or certain obtaining operations described herein as being performed by a network node. Any information, data and/or signals may be received from a wireless device, another network node and/or any other network equipment. Similarly, antenna 2062, interface 2090, and/or processing circuitry 2070 may be configured to perform any transmitting operations described herein as being performed by a net-work node. Any information, data and/or signals may be transmitted to a wireless device, another network node and/or any other network equipment.

Power circuitry 2087 may comprise, or be coupled to, power management circuitry and is configured to supply the components of network node 2060 with power for performing the functionality described herein. Power circuitry 2087 may receive power from power source 2086. Power source 2086 and/or power circuitry 2087 may be configured to provide power to the various components of network node 2060 in a form suitable for the respective components (e.g., at a voltage and current level needed for each respective component). Power source 2086 may either be included in, or external to, power circuitry 2087 and/or network node 2060. For example, network node 2060 may be connectable to an external power source (e.g., an electricity outlet) via an input circuitry or interface such as an electrical cable, whereby the external power source supplies power to power circuitry 2087. As a further example, power source 2086 may comprise a source of power in the form of a battery or battery pack which is connected to, or integrated in, power circuitry 2087. The battery may provide backup power should the external power source fail. Other types of power sources, such as photovoltaic devices, may also be used.

Alternative embodiments of network node 2060 may include additional components beyond those shown in FIG. 20 that may be responsible for providing certain aspects of the network node's functionality, including any of the functionality described herein and/or any functionality necessary to support the subject matter described herein. For example, network node 2060 may include user interface equipment to allow input of information into network node 2060 and to allow output of information from network node 2060. This may allow a user to perform diagnostic, maintenance, repair, and other administrative functions for network node 2060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 may include multiple sets of one or more of the illustrated components for different wireless technologies supported by WD 2010, such as, for example, GSM, WCDMA, LTE, NR, WiFi, WiMAX, or Bluetooth wireless technologies, just to mention a few. These wireless technologies may be integrated into the same or different chips or set of chips as other components within WD 2010.

Antenna 2011 may include one or more antennas or antenna arrays, configured to send and/or receive wireless signals, and is connected to interface 2014. In certain alternative embodiments, antenna 2011 may be separate from WD 2010 and be connectable to WD 2010 through an interface or port. Antenna 2011, interface 2014, and/or processing circuitry 2020 may be configured to perform any receiving or transmitting operations described herein as being performed by a WD. Any information, data and/or signals may be received from a network node and/or another WD. In some embodiments, radio front end circuitry and/or antenna 2011 may be considered an interface.

As illustrated, interface 2014 comprises radio front end circuitry 2012 and antenna 2011. Radio front end circuitry 2012 comprise one or more filters 2018 and amplifiers 2016. Radio front end circuitry 2012 is connected to antenna 2011 and processing circuitry 2020, and is configured to condition signals communicated between antenna 2011 and processing circuitry 2020. Radio front end circuitry 2012 may be coupled to or a part of antenna 2011. In some embodiments, WD 2010 may not include separate radio front end circuitry 2012; rather, processing circuitry 2020 may comprise radio front end circuitry and may be connected to antenna 2011. Similarly, in some embodiments, some or all of RF transceiver circuitry 2022 may be considered a part of interface 2014. Radio front end circuitry 2012 may receive digital data that is to be sent out to other network nodes or WDs via a wireless connection. Radio front end circuitry 2012 may convert the digital data into a radio signal having the appropriate channel and bandwidth parameters using a combination of filters 2018 and/or amplifiers 2016. The radio signal may then be transmitted via antenna 2011. Similarly, when receiving data, antenna 2011 may collect radio signals which are then converted into digital data by radio front end circuitry 2012. The digital data may be passed to processing circuitry 2020. In other embodiments, the interface may comprise different components and/or different combinations of components.

Processing circuitry 2020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2010 components, such as device readable medium 2030, WD 2010 functionality. Such functionality may include providing any of the various wireless features or benefits discussed herein. For example, processing circuitry 2020 may execute instructions stored in device readable medium 2030 or in memory within processing circuitry 2020 to provide the functionality disclosed herein.

As illustrated, processing circuitry 2020 includes one or more of RF transceiver circuitry 2022, baseband processing circuitry 2024, and application processing circuitry 2026. In other embodiments, the processing circuitry may comprise different components and/or different combinations of components. In certain embodiments processing circuitry 2020 of WD 2010 may comprise a SOC. In some embodiments, RF transceiver circuitry 2022, baseband processing circuitry 2024, and application processing circuitry 2026 may be on separate chips or sets of chips. In alternative embodiments, part or all of baseband processing circuitry 2024 and application processing circuitry 2026 may be combined into one chip or set of chips, and RF transceiver circuitry 2022 may be on a separate chip or set of chips. In still alternative embodiments, part or all of RF transceiver circuitry 2022 and baseband processing circuitry 2024 may be on the same chip or set of chips, and application processing circuitry 2026 may be on a separate chip or set of chips. In yet other alternative embodiments, part or all of RF transceiver circuitry 2022, baseband processing circuitry 2024, and application processing circuitry 2026 may be combined in the same chip or set of chips. In some embodiments, RF transceiver circuitry 2022 may be a part of interface 2014. RF transceiver circuitry 2022 may condition RF signals for processing circuitry 2020.

In certain embodiments, some or all of the functionality described herein as being performed by a WD may be provided by processing circuitry 2020 executing instructions stored on device readable medium 2030, which in certain embodiments may be a computer-readable storage medium. In alternative embodiments, some or all of the functionality may be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 may be configured to perform any determining, calculating, or similar operations (e.g., certain obtaining operations) described herein as being performed by a WD. These operations, as performed by processing circuitry 2020, may include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 may be operable to store a computer program, software, an application including one or more of logic, rules, code, tables, etc. and/or other instructions capable of being executed by processing circuitry 2020. Device readable medium 2030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2020. In some embodiments, processing circuitry 2020 and device readable medium 2030 may be considered to be integrated.

User interface equipment 2032 may provide components that allow for a human user to interact with WD 2010. Such interaction may be of many forms, such as visual, audial, tactile, etc. User interface equipment 2032 may be operable to produce output to the user and to allow the user to provide input to WD 2010. The type of interaction may vary depending on the type of user interface equipment 2032 installed in WD 2010. For example, if WD 2010 is a smart phone, the interaction may be via a touch screen; if WD 2010 is a smart meter, the interaction may be through a screen that provides usage (e.g., the number of gallons used) or a speaker that provides an audible alert (e.g., if smoke is detected). User interface equipment 2032 may include input interfaces, devices and circuits, and output interfaces, devices and circuits. User interface equipment 2032 is configured to allow input of information into WD 2010, and is connected to processing circuitry 2020 to allow processing circuitry 2020 to process the input information. User interface equipment 2032 may include, for example, a microphone, a proximity or other sensor, keys/buttons, a touch display, one or more cameras, a USB port, or other input circuitry. User interface equipment 2032 is also configured to allow output of information from WD 2010, and to allow processing circuitry 2020 to output information from WD 2010. User interface equipment 2032 may include, for example, a speaker, a display, vibrating circuitry, a USB port, a headphone interface, or other output circuitry. Using one or more input and output interfaces, devices, and circuits, of user interface equipment 2032, WD 2010 may communicate with end users and/or the wireless network, and allow them to benefit from the functionality described herein.

Auxiliary equipment 2034 is operable to provide more specific functionality which may not be generally performed by WDs. This may comprise specialized sensors for doing measurements for various purposes, interfaces for additional types of communication such as wired communications etc. The inclusion and type of components of auxiliary equipment 2034 may vary depending on the embodiment and/or scenario.

Power source 2036 may, in some embodiments, be in the form of a battery or battery pack. Other types of power sources, such as an external power source (e.g., an electricity outlet), photovoltaic devices or power cells, may also be used. WD 2010 may further comprise power circuitry 2037 for delivering power from power source 2036 to the various parts of WD 2010 which need power from power source 2036 to carry out any functionality described or indicated herein. Power circuitry 2037 may in certain embodiments comprise power management circuitry. Power circuitry 2037 may additionally or alternatively be operable to receive power from an external power source; in which case WD 2010 may be connectable to the external power source (such as an electricity outlet) via input circuitry or an interface such as an electrical power cable. Power circuitry 2037 may also in certain embodiments be operable to deliver power from an external power source to power source 2036. This may be, for example, for the charging of power source 2036. Power circuitry 2037 may perform any formatting, converting, or other modification to the power from power source 2036 to make the power suitable for the respective components of WD 2010 to which power is supplied.

Figure 21:
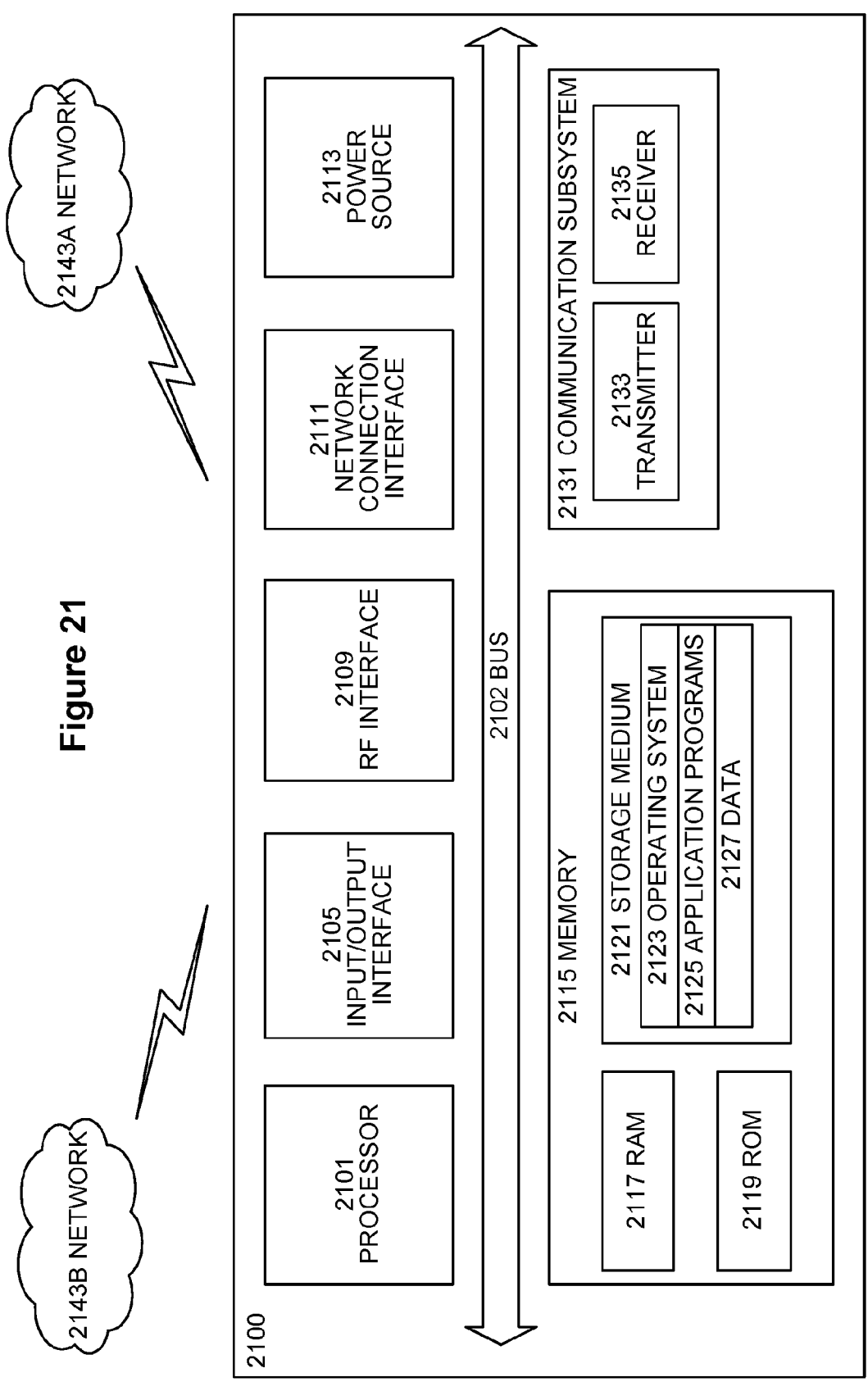
FIG. 21 is a block diagram of a user equipment in accordance with some embodiments

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2100 may be any UE identified by the 3rd Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2113, and/or any other component, or any combination thereof. Storage medium 2121 includes operating system 2123, application program 2125, and data 2127. In other embodiments, storage medium 2121 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 2101 may be configured to process computer instructions and data. Processing circuitry 2101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 may include two central processing units (CPUs). Data may be information in a form suitable for use by a computer.

In the depicted embodiment, input/output interface 2105 may be configured to provide a communication interface to an input device, output device, or input and output device. UE 2100 may be configured to use an output device via input/output interface 2105. An output device may use the same type of interface port as an input device. For example, a USB port may be used to provide input to and output from UE 2100. The output device may be a speaker, a sound card, a video card, a display, a monitor, a printer, an actuator, an emitter, a smartcard, another output device, or any combination thereof. UE 2100 may be configured to use an input device via input/output interface 2105 to allow a user to capture information into UE 2100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 2109 may be configured to provide a communication interface to RF components such as a transmitter, a receiver, and an antenna. Network connection interface 2111 may be configured to provide a communication interface to network 2143A. Network 2143A may encompass wired and/or wireless networks such as a local-area network (LAN), a wide-area network (WAN), a computer network, a wireless network, a telecommunications network, another like network or any combination thereof. For example, network 2143A may comprise a Wi-Fi network. Network connection interface 2111 may be configured to include a receiver and a transmitter interface used to communicate with one or more other devices over a communication network according to one or more communication protocols, such as Ethernet, TCP/IP, SONET, ATM, or the like. Network connection interface 2111 may implement receiver and transmitter functionality appropriate to the communication network links (e.g., optical, electrical, and the like). The transmitter and receiver functions may share circuit components, software or firmware, or alternatively may be implemented separately.

RAM 2117 may be configured to interface via bus 2102 to processing circuitry 2101 to provide storage or caching of data or computer instructions during the execution of software programs such as the operating system, application programs, and device drivers. ROM 2119 may be configured to provide computer instructions or data to processing circuitry 2101. For example, ROM 2119 may be configured to store invariant low-level system code or data for basic system functions such as basic input and output (I/O), startup, or reception of keystrokes from a keyboard that are stored in a non-volatile memory. Storage medium 2121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2121 may be configured to include operating system 2123, application program 2125 such as a web browser application, a widget or gadget engine or another application, and data file 2127. Storage medium 2121 may store, for use by UE 2100, any of a variety of various operating systems or combinations of operating systems.

Storage medium 2121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2121 may allow UE 2100 to access computer-executable instructions, application programs or the like, stored on transitory or non-transitory memory media, to off-load data, or to upload data. An article of manufacture, such as one utilizing a communication system may be tangibly embodied in storage medium 2121, which may comprise a device readable medium.

In FIG. 21, processing circuitry 2101 may be configured to communicate with network 2143B using communication subsystem 2131. Network 2143A and network 2143B may be the same network or networks or different network or networks. Communication subsystem 2131 may be configured to include one or more transceivers used to communicate with network 2143B. For example, communication subsystem 2131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2133 and/or receiver 2135 to implement transmitter or receiver functionality, respectively, appropriate to the RAN links (e.g., frequency allocations and the like). Further, transmitter 2133 and receiver 2135 of each transceiver may share circuit components, software or firmware, or alternatively may be implemented separately.

In the illustrated embodiment, the communication functions of communication subsystem 2131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 may include cellular communication, Wi-Fi communication, Bluetooth communication, and GPS communication. Network 2143B may encompass wired and/or wireless networks such as a local-area network (LAN), a wide-area network (WAN), a computer network, a wireless network, a telecommunications network, another like network or any combination thereof. For example, network 2143B may be a cellular network, a Wi-Fi network, and/or a near-field network. Power source 2113 may be configured to provide alternating current (AC) or direct current (DC) power to components of UE 2100.

The features, benefits and/or functions described herein may be implemented in one of the components of UE 2100 or partitioned across multiple components of UE 2100. Further, the features, benefits, and/or functions described herein may be implemented in any combination of hardware, software or firmware. In one example, communication subsystem 2131 may be configured to include any of the components described herein. Further, processing circuitry 2101 may be configured to communicate with any of such components over bus 2102. In another example, any of such components may be represented by program instructions stored in memory that when executed by processing circuitry 2101 perform the corresponding functions described herein. In another example, the functionality of any of such components may be partitioned between processing circuitry 2101 and communication subsystem 2131. In another example, the non-computationally intensive functions of any of such components may be implemented in software or firmware and the computationally intensive functions may be implemented in hardware.

Figure 22:
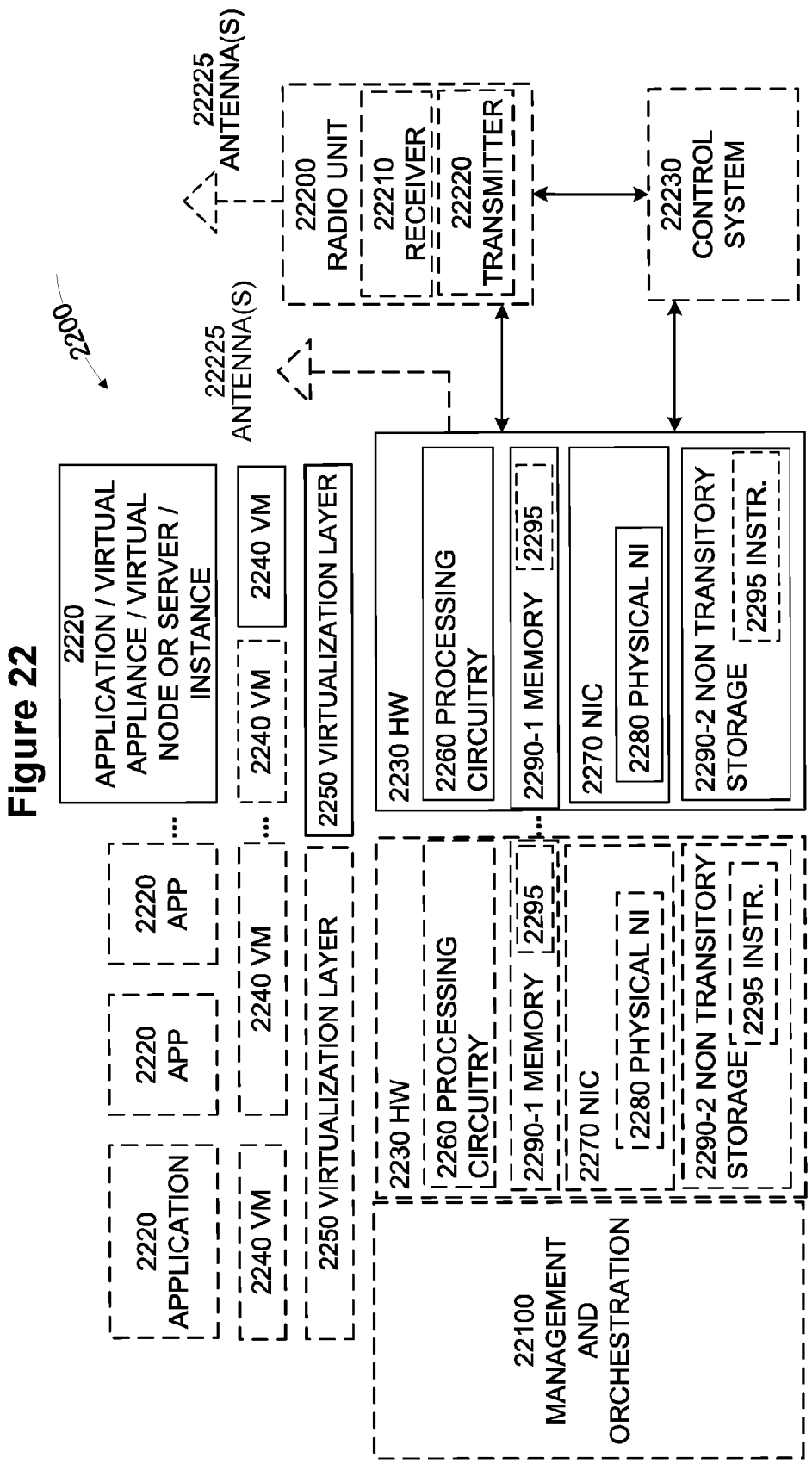
FIG. 22 is a block diagram of a virtualization environment in accordance with some embodiments.

FIG. 22 illustrates a virtualization environment in accordance with some embodiments.

FIG. 22 is a schematic block diagram illustrating a virtualization environment 2200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node may be entirely virtualized.

The functions may be implemented by one or more applications 2220 (which may alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200, comprises general-purpose or special-purpose network hardware devices 2230 comprising a set of one or more processors or processing circuitry 2260, which may be commercial off-the-shelf (COTS) processors, dedicated Application Specific Integrated Circuits (ASICs), or any other type of processing circuitry including digital or analog hardware components or special purpose processors. Each hardware device may comprise memory 2290-1 which may be non-persistent memory for temporarily storing instructions 2295 or software executed by processing circuitry 2260. Each hardware device may comprise one or more network interface controllers (NICs) 2270, also known as network interface cards, which include physical network interface 2280. Each hardware device may also include non-transitory, persistent, machine-readable storage media 2290-2 having stored therein software 2295 and/or instructions executable by processing circuitry 2260. Software 2295 may include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240 comprise virtual processing, virtual memory, virtual networking or interface and virtual storage, and may be run by a corresponding virtualization layer 2250 or hypervisor. Different embodiments of the instance of virtual appliance 2220 may be implemented on one or more of virtual machines 2240, and the implementations may be made in different ways.

During operation, processing circuitry 2260 executes software 2295 to instantiate the hypervisor or virtualization layer 2250, which may sometimes be referred to as a virtual machine monitor (VMM). Virtualization layer 2250 may present a virtual operating platform that appears like networking hardware to virtual machine 2240.

As shown in FIG. 22, hardware 2230 may be a standalone network node with generic or specific components. Hardware 2230 may comprise antenna 22225 and may implement some functions via virtualization. Alternatively, hardware 2230 may be part of a larger cluster of hardware (e.g. such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2240 may be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22210 may be coupled to one or more antennas 22225. Radio units 22200 may communicate directly with hardware nodes 2230 via one or more appropriate network interfaces and may be used in combination with the virtual components to provide a virtual node with radio capabilities, such as a radio access node or a base station.

In some embodiments, some signalling can be effected with the use of control system 22230 which may alternatively be used for communication between the hardware nodes 2230 and radio units 22200.

Figure 23:
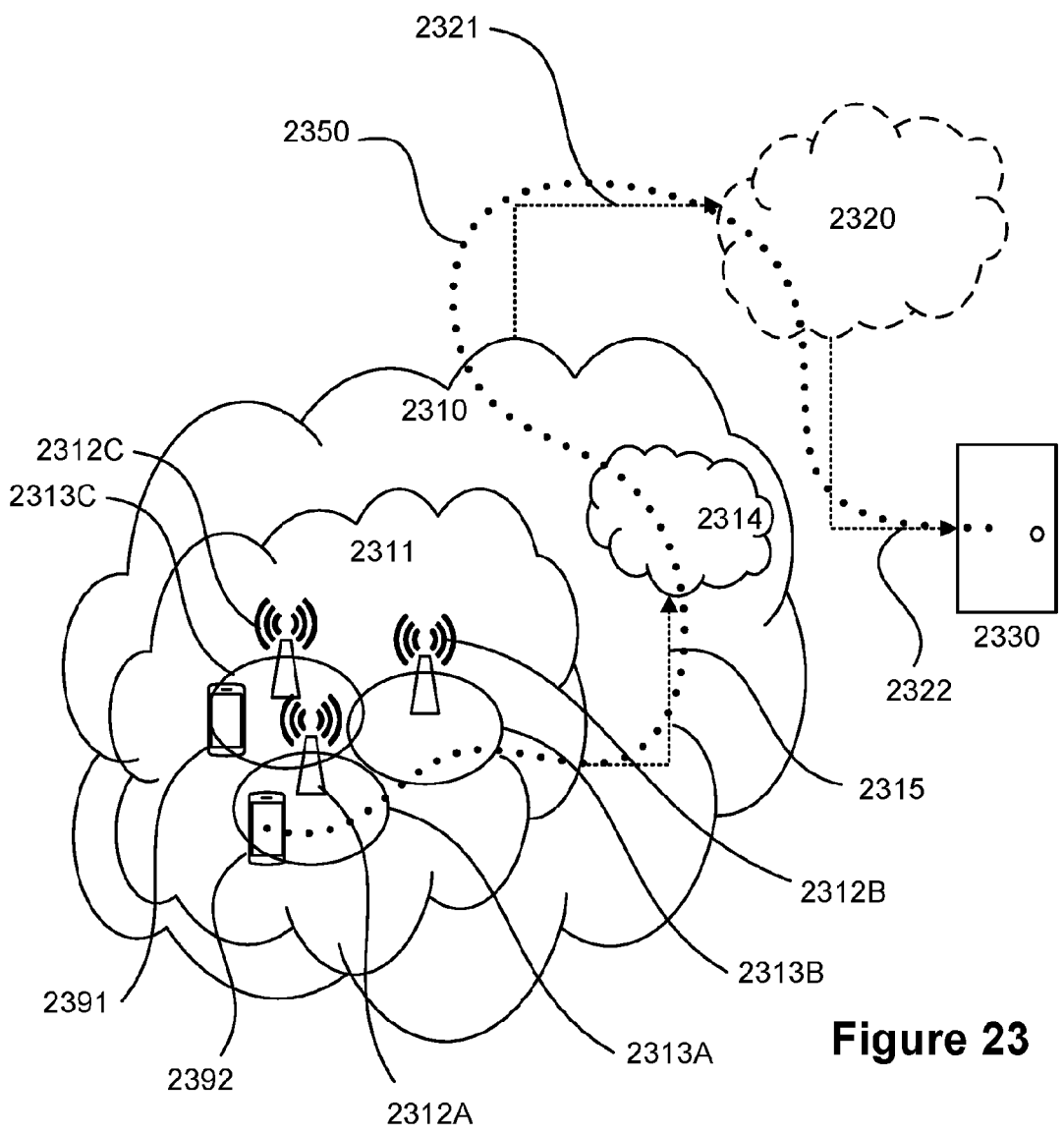
FIG. 23 is a block diagram of a telecommunication network connected via an intermediate network to a host computer in accordance with some embodiments.

FIG. 23 illustrates a telecommunication network connected via an intermediate network to a host computer in accordance with some embodiments.

With reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312A, 2312B, 2312C, such as NBs, eNBs, gNBs or other types of wireless access points, each defining a corresponding coverage area 2313A, 2313B, 2313C. Each base station 2312A, 2312B, 2312C is connectable to core network 2314 over a wired or wireless connection 2315. A first UE 2391 located in coverage area 2313C is configured to wirelessly connect to, or be paged by, the corresponding base station 2312C. A second UE 2392 in coverage area 2313A is wirelessly connectable to the corresponding base station 2312A. While a plurality of UEs 2391, 2392 are illustrated in this example, the disclosed embodiments are equally applicable to a situation where a sole UE is in the coverage area or where a sole UE is connecting to the corresponding base station 2312.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Figure 24:
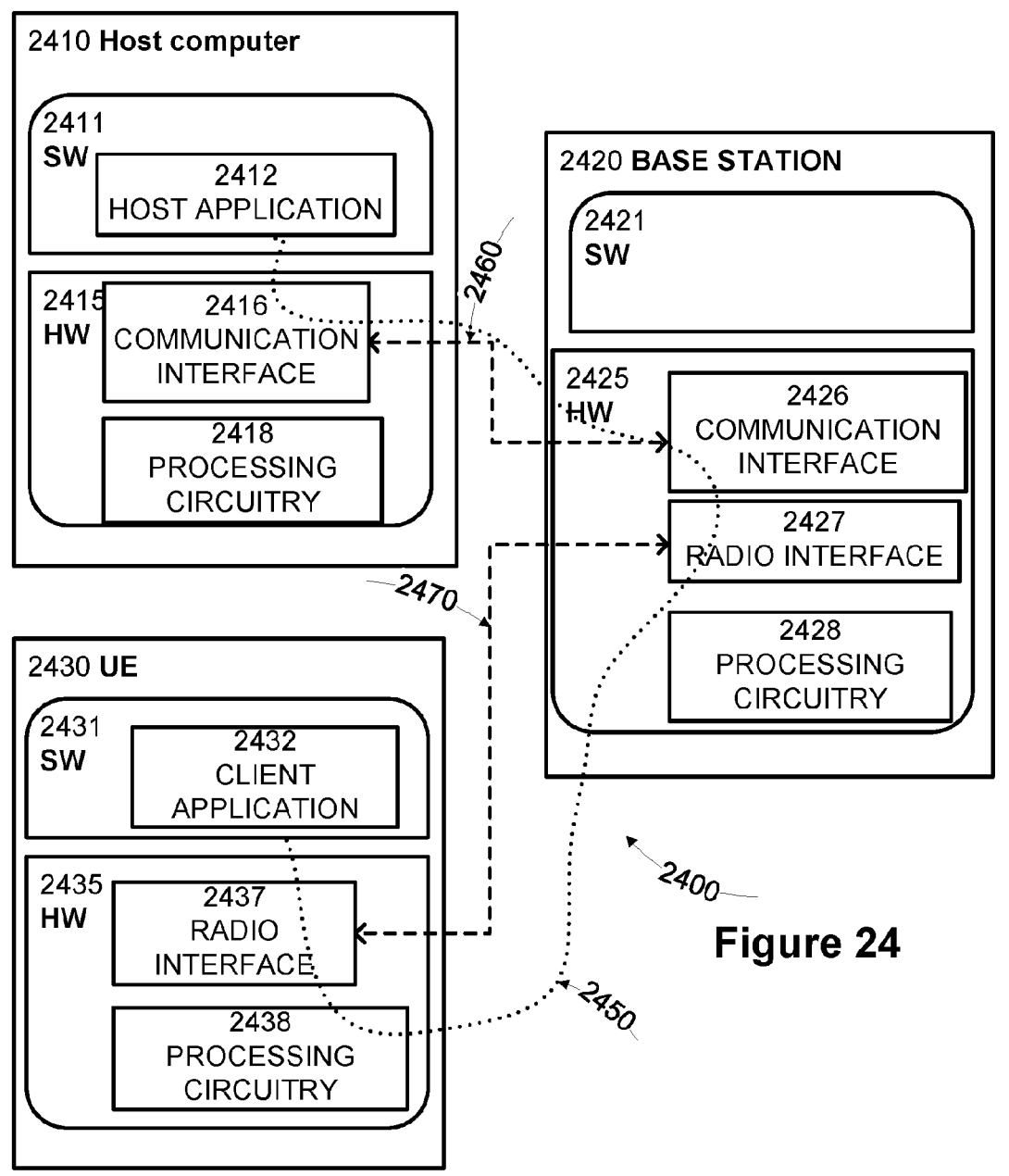
FIG. 24 is a block diagram of a host computer communicating via a base station with a user equipment over a partially wireless connection in accordance with some embodiments.

FIG. 24 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 24. In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312A, 2312B, 2312C and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments may improve the performance of OTT services provided to UE 2430 using OTT connection 2450, in which wireless connection 2470 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figures 25, 26:
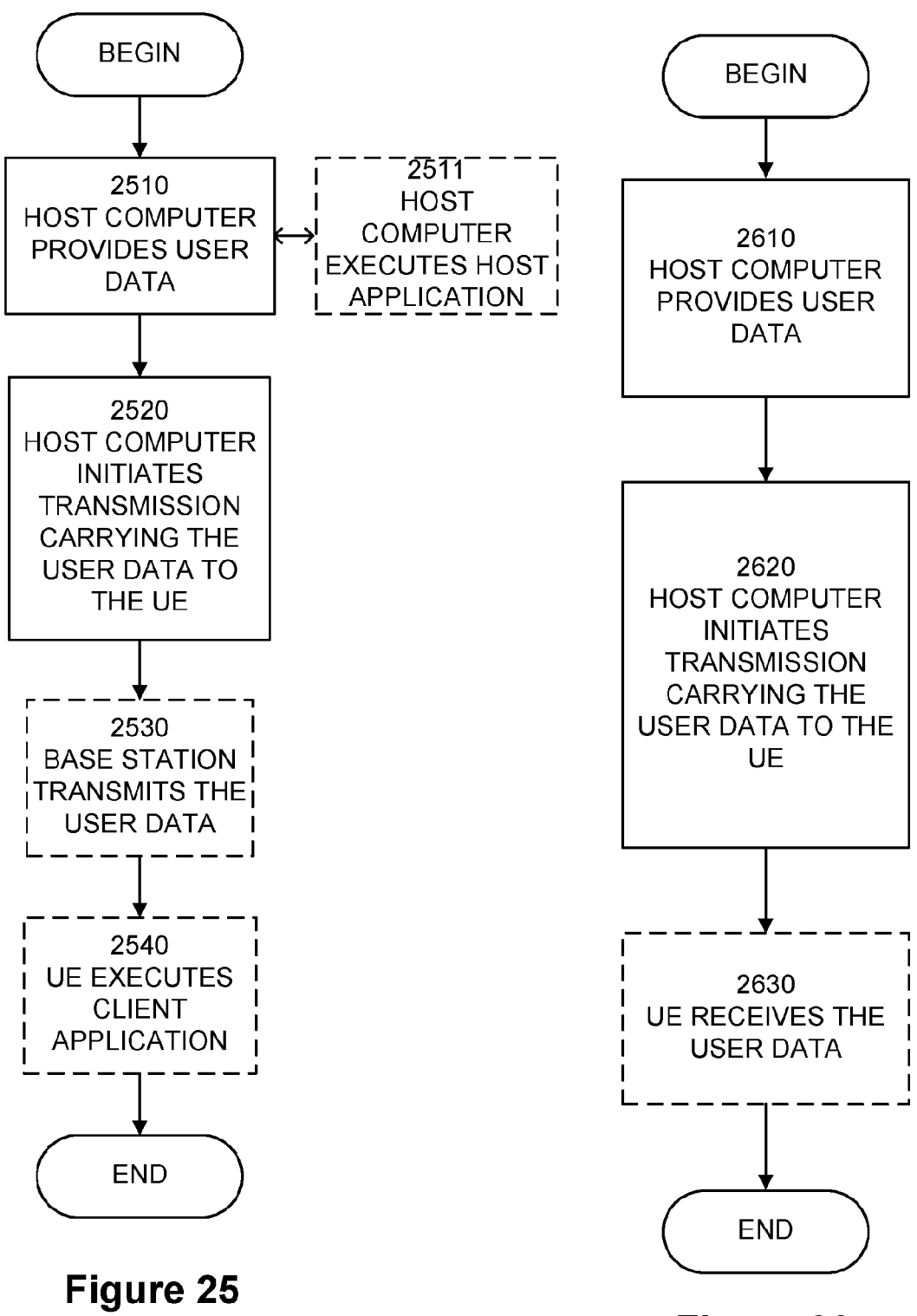
FIG. 25 is a block diagram of methods implemented in a communication system including a host computer, a base station and a user equipment in accordance with some embodiments.
FIG. 26 is a block diagram of methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional)

of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figures 27, 28:
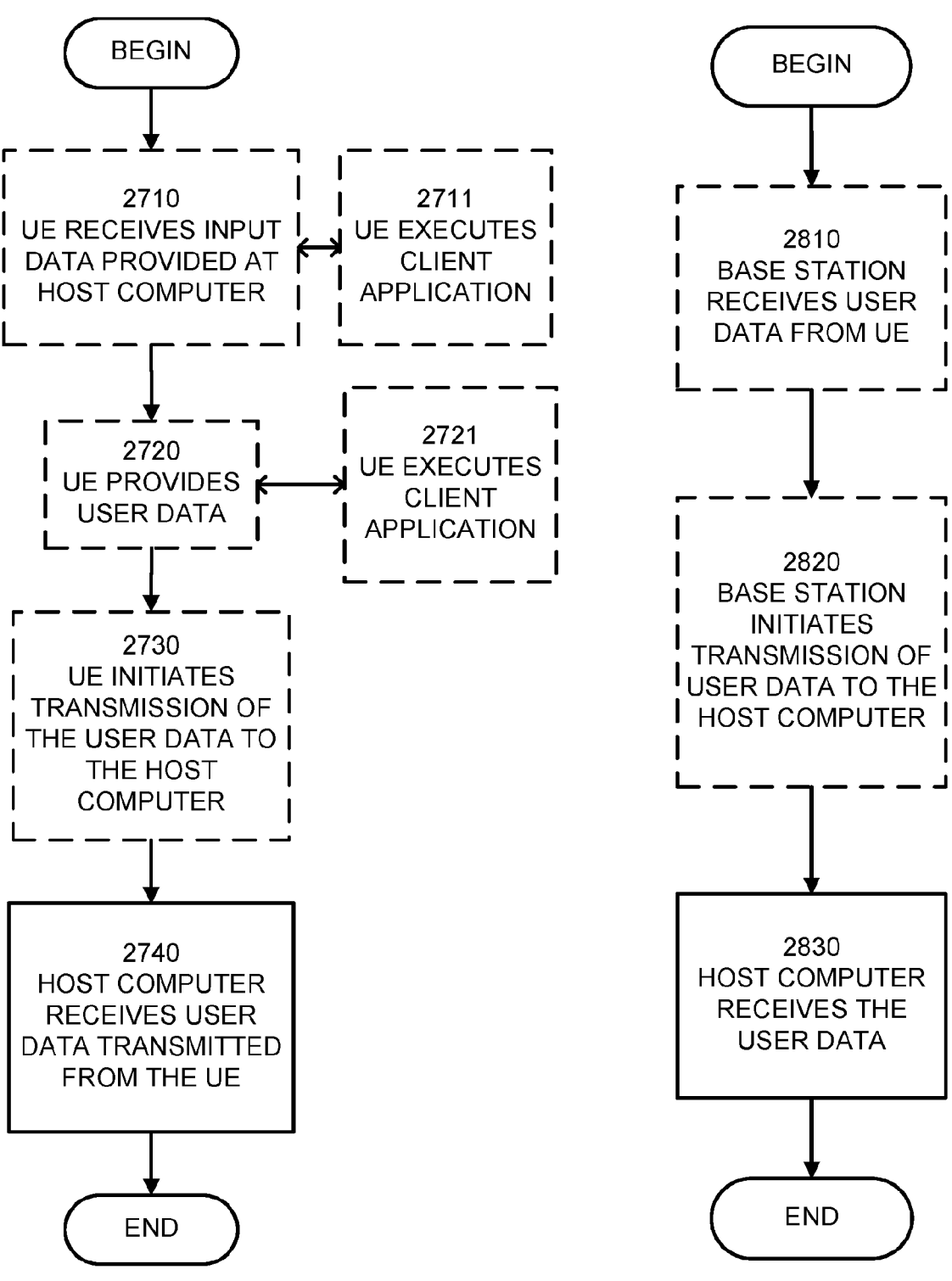
FIG. 27 is a block diagram of methods implemented in a communication system including a host computer, a base station and a user equipment in accordance with some embodiments.
FIG. 28 is a block diagram of methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method performed by a user equipment (UE) comprising:

obtaining a maximum timing advance (TA) for wireless communications to apply for a serving base station (BS) switching in a high speed train (HST) network;

updating the TA for wireless communications according to TA commands as the UE proceeds along a track in the HST network;

determining that a BS panel serving the UE has switched to a new BS panel along the track; and responsive to determining that the BS panel serving the UE has switched to the new BS panel, setting the TA to a minimum TA for wireless communication or to the maximum TA for wireless communications based on a direction of travel of the HST with respect to the new BS panel.

2. The method of claim 1, wherein obtaining the maximum TA comprises receiving the maximum TA from the HST network.

3. The method of claim 1, wherein obtaining the maximum TA comprises obtaining the maximum TA by inspection of timing advance at the point of panel/BS change on a previous occasion.

4. The method of claim 1, wherein obtaining the maximum TA comprises obtaining the maximum TA by a pre-configuration of maximum TA on a previous occasion.

5. The method of claim 1, further comprising determining that the UE is in the HST network, the HST network comprising a uni-directional HST network.

6. The method of claim 5 wherein determining that the UE is in the HST network comprises receiving an indication that the UE is in the HST network.

7. The method of claim 1, wherein determining that the BS panel serving the UE has switched to the next BS comprises determining that the BS panel serving the UE has switched based on a transmission configuration indicator (TCI) switch.

8. The method of claim 1, wherein determining that the BS panel serving the UE has switched to the next BS comprises determining that the BS panel serving the UE has switched based on a handover of the UE to the next BS.

9. The method of claim 1, wherein determining that the BS panel serving the UE has switched to the next BS comprises determining that the BS panel serving the UE has switched based on receiving a signal indicating a change in the BS panel serving the UE.

10. The method of claim 1 wherein setting the TA to the minimum TA for wireless communication or to the maximum TA for wireless communications comprises setting the TA to the maximum TA responsive to the HST traveling towards the new BS panel immediately after handover or TCI change.

11. The method of claim 1 wherein setting the TA to the minimum TA for wireless communication or to the maximum TA for wireless communications comprises setting the TA to the minimum TA responsive to the HST traveling away from the new BS panel immediately after handover or TCI change.

12. A method performed by a user equipment (UE) comprising:

determining a Doppler shift relating to a speed of a high speed train (HST);

using a first base station (BS) panel to transmit and receive wireless communications in a bi-directional HST network based on the Doppler shift;

determining that the first BS panel serving the UE has switched to a second BS panel; and using the second panel to transmit and receive wireless communications in the bi-directional HST network based on a reversed Doppler shift.

13. The method of claim 12, further comprising:

determining that the UE is in a bi-directional high speed train (HST) network.

14. The method of claim 12 wherein determining that the UE is in the bi-directional HST network comprises receiving an indication that the UE is in the bi-directional HST network.

15. The method of claim 12, wherein determining the Doppler shift comprises: using a frequency reference source independent of signals received from base stations along a track the UE is traveling along in the bi-directional HST network.

16. The method of claim 15, wherein using the frequency reference source independent of signals received from the base stations comprises:

using a frequency source provided by an onboard operation control system for the HST; or using a global positioning system (GPS) to determine the Doppler shift.

17. The method of claim 12, wherein determining that the BS panel serving the UE has switched to a second BS panel comprises:

determining that the BS panel serving the UE has switched based on a transmission configuration indicator (TCI) switch;

determining that the BS panel serving the UE has switched based on a handover of the UE to a next BS; or determining that the BS panel serving the UE has switched based on receiving a signal indicating a change in the BS panel serving the UE.

18. A method performed by a user equipment (UE) in a bi-directional high speed train (HST) network deployment, the method comprising:

maintaining a first Doppler-compensated demodulation frequency for use with a forward pointing antenna panel and relating to a first speed of an HST, for the forward pointing antenna panel;

determining a second Doppler-compensated demodulation frequency for use with a backwards pointing antenna panel and relating to a second speed of an HST for the backwards pointing antenna panel;

responsive to switching to the forward pointing panel, switching to the first Doppler-compensated demodulation frequency in transmitting and receiving wireless communications in the bi-directional HST network; and responsive to switching to the backward pointing panel, switching to the second Doppler-compensated demodulation frequency in transmitting and receiving wireless communications in the bi-directional HST network.

19. The method of claim 18, further comprising:
determining that the UE is in a bi-directional HST net-
work.

20. The method of claim 18 wherein maintaining the first
Doppler-compensated demodulation frequency comprises
using signals only received with the forward pointing
antenna panel to maintain the first Doppler-compensated
demodulation frequency.

21. The method of claim 18 wherein maintaining the
second Doppler-compensated demodulation frequency com-
prises using signals only received with the backward point-
ing antenna panel to maintain the second Doppler-compen-
sated demodulation frequency.

22. A method performed by a user equipment (UE) in a
bi-directional high speed train (HST) network having a track
covered by a plurality of beams for wireless communica-
tions, the method comprising:
receiving a configuration having timing advance values
associated with the plurality of beams;
setting the timing advance to the timing advance value
associated with a first beam of the plurality of beams
presently covering the UE; and
responsive to the UE transitioning from the first beam to
a second beam during movement of the HST, setting
the timing advance to the timing advance value asso-
ciated with the second beam.

\* \* \* \* \*